ns011653402B2

(12) United States Patent
Yang et al.

(10) Patent No.: US 11,653,402 B2
(45) Date of Patent: May 16, 2023

(54) USER EQUIPMENT (UE) ASSISTED TERMINATION SELECTION FOR NON-STANDALONE OR DUAL CONNECTIVITY

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 171 days.

(21) Appl. No.: 17/389,852

(22) Filed: Jul. 30, 2021

(65) Prior Publication Data

US 2023/0030473 A1    Feb. 2, 2023

(51) Int. Cl.
*H04W 8/24* (2009.01)
*H04W 24/02* (2009.01)
(Continued)

(52) U.S. Cl.
CPC ............ *H04W 76/16* (2018.02); *H04W 8/24* (2013.01); *H04W 24/02* (2013.01); *H04W 24/08* (2013.01); *H04W 24/10* (2013.01); *H04W 28/0247* (2013.01); *H04W 28/085* (2013.01); *H04W 28/0815* (2020.05); *H04W 36/0069* (2018.08); *H04W 36/165* (2013.01);
(Continued)

(58) Field of Classification Search
CPC .... H04B 7/0212; H04B 17/0082–3913; H04L 5/0001–26; H04W 8/005–30; H04W 24/02–10; H04W 28/02–26; H04W 36/0005–385; H04W 48/02–20; H04W 72/02–569; H04W 74/002–008; H04W 76/10–50; H04W 84/02–16; H04W 88/005–188; H04W 92/02–24
See application file for complete search history.

(56) References Cited

PUBLICATIONS

Huawei: "[AT113-e] [230] [eDCCA] Solution Alternatives for SCG Activation and Deactivation (Huawei)", 3GPP TSG-RAN WG2#113-e, R2-2101969, 3rd Generation Partnership Project, Mobile Competence Centre, 650, Route Des Lucioles, F-06921 Sophia-Antipolis Cedex, France, vol. RAN WG2, No. Online, Jan. 25, 2021-Feb. 5, 2021, 33 Pages, Feb. 5, 2021, XP051978145, p. 27, line 30—p. 42, line 3.

(Continued)

*Primary Examiner* — Timothy J Weidner
(74) *Attorney, Agent, or Firm* — Holland & Hart LLP; Dang M. Vo

(57) ABSTRACT

Methods, systems, and devices for wireless communications are described. In a wireless communications system, a user equipment (UE) may determine a preference of the UE for a termination point between a core network and a radio access network (RAN), the core network and the RAN supporting communications for the UE via at least one or a first cell and a second cell each associated with a multi-connectivity mode of the UE. The UE may transmit, to a base station, an indication of the preference of the UE for the termination point. In some cases, the base station may determine the termination point based on receiving the indication of the preference of the UE, and the base station may transmit a message indicating a configuration for the multi-connectivity mode to the UE, the configuration indicating the determined termination point.

30 Claims, 17 Drawing Sheets

(51) Int. Cl.
*H04W 24/08* (2009.01)
*H04W 24/10* (2009.01)
*H04W 28/02* (2009.01)
*H04W 28/08* (2023.01)
*H04W 36/00* (2009.01)
*H04W 36/16* (2009.01)
*H04W 36/36* (2009.01)
*H04W 76/16* (2018.01)
*H04W 76/22* (2018.01)
*H04W 76/30* (2018.01)
*H04W 84/02* (2009.01)
*H04W 88/06* (2009.01)
*H04W 88/08* (2009.01)
*H04W 88/14* (2009.01)
*H04W 92/02* (2009.01)
*H04W 92/04* (2009.01)
*H04W 92/10* (2009.01)
*H04W 92/20* (2009.01)

(52) U.S. Cl.
CPC .......... *H04W 36/36* (2013.01); *H04W 76/22* (2018.02); *H04W 76/30* (2018.02); *H04W 84/02* (2013.01); *H04W 88/06* (2013.01); *H04W 88/08* (2013.01); *H04W 88/14* (2013.01); *H04W 92/02* (2013.01); *H04W 92/045* (2013.01); *H04W 92/10* (2013.01); *H04W 92/20* (2013.01)

(56) References Cited

PUBLICATIONS

International Search Report and Written Opinion—PCT/US2022/036798—ISA/EPO—dated Oct. 14, 2022.
NTT Docomo, et al., "On Reconfiguration to option 2c/2x for SCG Addition/Modification", 3GPP TSG-RAN2 Adhoc 1801, R2-1801245_OPTION 2C-2X Reconf and SCG Failure, 3rd Generation Partnership Project, Mobile Competence Centre, 650, Route Des Lucioles, F-06921 Sophia-Antipolis Cedex, France, vol. RAN WG2, No. Vancouver, Canada, Jan. 22, 2018-Jan. 26, 2018, 4 Pages, Jan. 12, 2018, XP051386673, the whole document.

USER EQUIPMENT (UE) ASSISTED TERMINATION SELECTION FOR NON-STANDALONE OR DUAL CONNECTIVITY

FIELD OF TECHNOLOGY

The following relates to wireless communications, including user equipment (UE) assisted termination selection for non-standalone (NSA) or dual connectivity (DC).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support communications with multiple cells, such as when operating in a dual connectivity (DC) mode. The quality of some cells may vary over time, which may result in data loss or poor connections with such cells. Techniques for managing communications between the UE and the cells may be deficient.

SUMMARY

The described techniques relate to improved methods, systems, devices, and apparatuses that support user equipment (UE) assisted termination selection for non-standalone (NSA) or dual connectivity (DC) systems. Generally, the described techniques provide for a UE to assist in termination selection as well as secondary cell release and configuration for secondary cells in a multi-connectivity mode, such as DC in case of two cell operating mode. In some cases, the UE may operate in a multi-connectivity mode with at least a first cell (e.g., a primary cell supported by a master node) and a second cell (e.g., a secondary cell supported by a secondary node). The UE may determine a preference of the UE for a termination point between a core network and a radio access network (RAN) supporting communications for the UE using the first cell and the second cell. The UE may transmit an indication of the preference to a base station. In some cases, based on the preference, the base station may determine the secondary node termination point and the base station may transmit a message indicating the determined termination point to the UE. For example, the UE may determine and indicate a preference to release the second cell and move the termination point to the first cell, or the UE may determine and indicate a preference to maintain the termination point at the second cell based on parameters such as a respective coverage area of the first cell or the second cell.

A method for wireless communications at a UE is described. The method may include determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE and transmitting, to a base station, an indication of the preference of the UE for the termination point based on the determining.

An apparatus for wireless communications at a UE is described. The apparatus may include a processor, memory in electronic communication with the processor, and instructions stored in the memory, where the instructions are executable by the processor to determine, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE and transmit, to a base station, an indication of the preference of the UE for the termination point based on the determining.

Another apparatus for wireless communications at a UE is described. The apparatus may include means for determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE and means for transmitting, to a base station, an indication of the preference of the UE for the termination point based on the determining.

A non-transitory computer-readable medium storing code for wireless communications at a UE is described. The code may include instructions executable by a processor to determine, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE and transmit, to a base station, an indication of the preference of the UE for the termination point based on the determining.

In some examples of the method, apparatuses, and non-transitory computer-readable medium described herein, determining the preference of the UE for the termination point between the core network and the RAN may include operations, features, means, or instructions for determining, by the UE in the multi-connectivity mode with at least the first cell and the second cell, the preference of the UE for the termination point as one of a secondary node termination point, a master node termination point, or a secondary cell group (SCG) release.

In some examples of the method, apparatuses, and non-transitory computer-readable medium described herein, determining the preference of the UE for the termination point between the core network and the RAN may include operations, features, means, or instructions for determining, by the UE in the multi-connectivity mode with at least the first cell and the second cell, the preference of the UE for the termination point based on a radio frequency variation of the second cell, application traffic throughput associated with one of the first cell or the second cell, a latency associated with one of the first cell or the second cell, or a combination thereof.

Some examples of the method, apparatuses, and non-transitory computer-readable medium described herein may further include operations, features, means, or instructions for determining, by the UE in the multi-connectivity mode with at least the first cell and the second cell, a time interval for using the termination point between the core network and the RAN indicated by the preference of the UE and transmitting an indication of the time interval to the base station.

Some examples of the method, apparatuses, and non-transitory computer-readable medium described herein may further include operations, features, means, or instructions for determining, by the UE in the multi-connectivity mode with at least the first cell and the second cell, a time interval for using a current termination point between the core network and the RAN and transmitting an indication of the time interval to the base station.

Some examples of the method, apparatuses, and non-transitory computer-readable medium described herein may further include operations, features, means, or instructions for determining, by the UE in the multi-connectivity mode with at least the first cell and the second cell, a time interval for the UE to operate in a dormant mode with the second cell based on the preference of the UE for the termination point being the first cell and transmitting an indication of the time interval to the base station.

Some examples of the method, apparatuses, and non-transitory computer-readable medium described herein may further include operations, features, means, or instructions for receiving, from the base station, a message indicating a configuration for the multi-connectivity mode, the configuration indicating one of a secondary node termination point, a master node termination point, or an SCG release based on the indication of the preference of the UE.

Some examples of the method, apparatuses, and non-transitory computer-readable medium described herein may further include operations, features, means, or instructions for transmitting, by the UE, a measurement report indicating one or more measurements associated with the second cell, where the message indicating the configuration for the multi-connectivity mode may be received based on the measurement report.

In some examples of the method, apparatuses, and non-transitory computer-readable medium described herein, transmitting the indication of the preference of the UE for the termination point may include operations, features, means, or instructions for transmitting the indication of the preference of the UE for the termination point via radio resource control (RRC) signaling or a medium access control (MAC) control element (MAC-CE).

In some examples of the method, apparatuses, and non-transitory computer-readable medium described herein, the termination point corresponds to a master node associated with the first cell or a secondary node associated with the second cell.

In some examples of the method, apparatuses, and non-transitory computer-readable medium described herein, the UE may be operating in an NSA mode, a DC mode, or the multi-connectivity mode.

A method for wireless communications at a base station is described. The method may include receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE, determining the termination point between the core network and the RAN based on receiving the indication of the preference of the UE, and transmitting a message indicating a configuration for the multi-connectivity mode, the configuration indicating the determined termination point.

An apparatus for wireless communications at a base station is described. The apparatus may include a processor, memory in electronic communication with the processor, and instructions stored in the memory, where the instructions are executable by the processor to receive, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE, determine the termination point between the core network and the RAN based on receiving the indication of the preference of the UE, and transmit a message indicating a configuration for the multi-connectivity mode, the configuration indicating the determined termination point.

Another apparatus for wireless communications at a base station is described. The apparatus may include means for receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE, means for determining the termination point between the core network and the RAN based on receiving the indication of the preference of the UE, and means for transmitting a message indicating a configuration for the multi-connectivity mode, the configuration indicating the determined termination point.

A non-transitory computer-readable medium storing code for wireless communications at a base station is described. The code may include instructions executable by a processor to receive, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE, determine the termination point between the core network and the RAN based on receiving the indication of the preference of the UE, and transmit a message indicating a configuration for the multi-connectivity mode, the configuration indicating the determined termination point.

In some examples of the method, apparatuses, and non-transitory computer-readable medium described herein, determining the termination point between the core network and the RAN may include operations, features, means, or instructions for determining the termination point based on a switching frequency between secondary cell addition and secondary cell release, a bandwidth usage of one or more backhaul links associated with the base station, the first cell, or the second cell, a time duration associated with a current termination point, or any combination thereof.

Some examples of the method, apparatuses, and non-transitory computer-readable medium described herein may further include operations, features, means, or instructions for receiving, from the UE, an indication of a time interval for using the termination point between the core network and the RAN indicated by the preference of the UE and determining the termination point based on the time interval.

Some examples of the method, apparatuses, and non-transitory computer-readable medium described herein may further include operations, features, means, or instructions for receiving, from the UE, an indication of a time interval for using a current termination point between the core network and the RAN indicated by the preference of the UE and determining the termination point based on the time interval.

Some examples of the method, apparatuses, and non-transitory computer-readable medium described herein may further include operations, features, means, or instructions for receiving, from the UE, an indication of a time interval for the UE to operate in a dormant mode with the second cell based on the preference of the UE and determining the termination point based on the time interval.

Some examples of the method, apparatuses, and non-transitory computer-readable medium described herein may further include operations, features, means, or instructions for receiving, from the UE, a measurement report indicating one or more measurements associated with the second cell and determining the termination point based on the measurement report.

In some examples of the method, apparatuses, and non-transitory computer-readable medium described herein, receiving the indication of the preference of the UE may include operations, features, means, or instructions for receiving the indication of the preference of the UE for the termination point via RRC signaling or a MAC-CE.

In some examples of the method, apparatuses, and non-transitory computer-readable medium described herein, the configuration indicates one of a secondary node termination point, a master node termination point, or an SCG release based on the indication of the preference of the UE.

In some examples of the method, apparatuses, and non-transitory computer-readable medium described herein, the preference of the UE for the termination point may be one of a secondary node termination point, a master node termination point, or an SCG release.

In some examples of the method, apparatuses, and non-transitory computer-readable medium described herein, the preference of the UE for the termination point may be based on a radio frequency variation of the second cell, application traffic throughput associated with one of the first cell or the second cell, a latency associated with one of the first cell or the second cell, or a combination thereof.

In some examples of the method, apparatuses, and non-transitory computer-readable medium described herein, the termination point corresponds to a master node associated with the first cell or a secondary node associated with the second cell.

DETAILED DESCRIPTION

Figure 1:
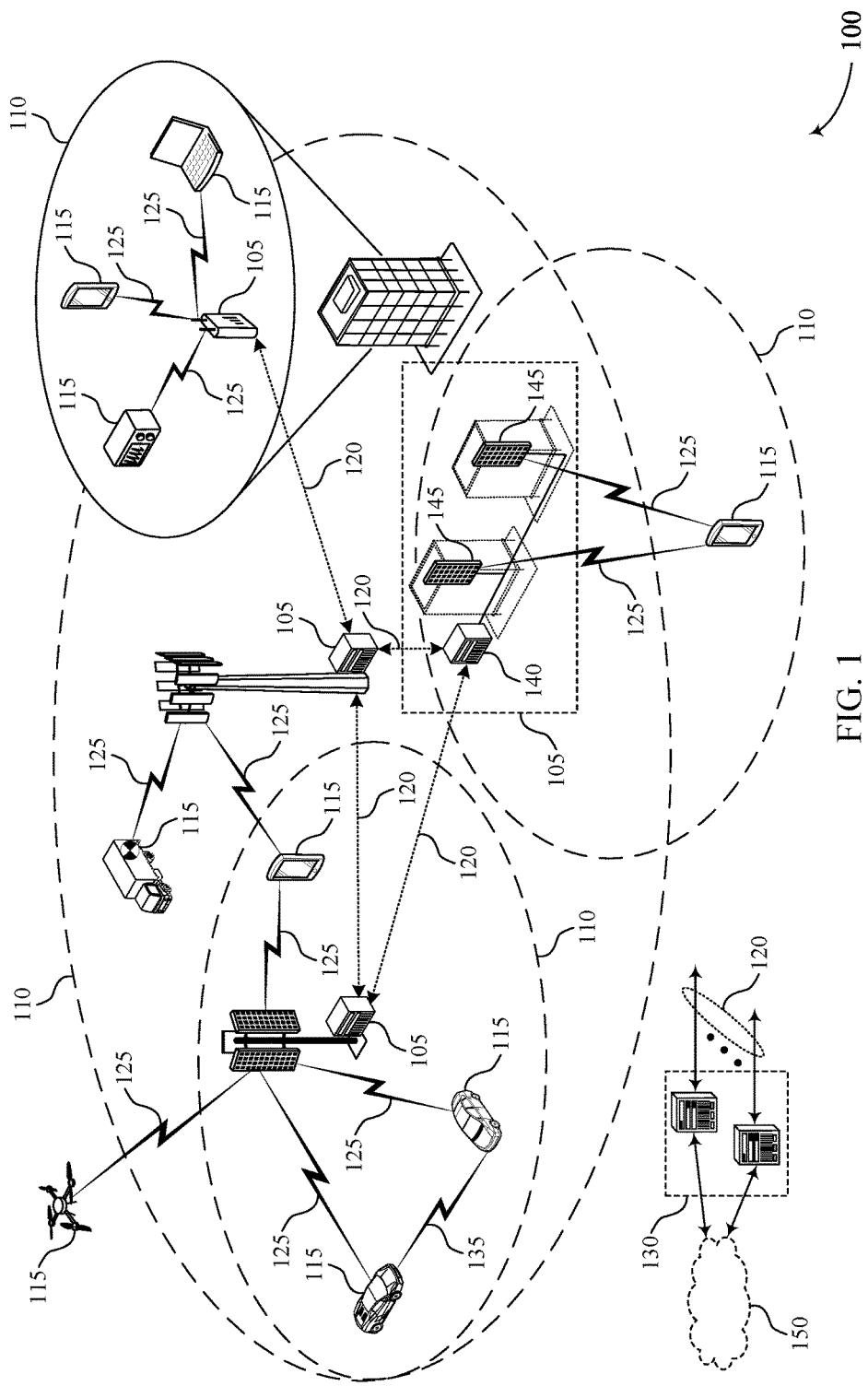
FIG. 1 illustrates an example of a wireless communications system that supports user equipment (UE) assisted termination selection for non-standalone (NSA) or dual connectivity (DC) in accordance with aspects of the present disclosure.

In some wireless communications systems, a user equipment (UE) may operate in a multi-connectivity mode with more than one cell. For example, the UE may operate in a multi-connectivity mode with a first cell associated with a master node and a secondary cell associated with a secondary node or a third cell associated with another secondary node. In some cases, if coverage from the secondary cell (e.g., a secondary cell group (SCG)) is discontinuous (e.g., when the UE is near the edge of a coverage area for the secondary cell), the UE may add or release the secondary cell, which may cause the connection between the core network and the radio access network (RAN) to switch frequently between the master node and the secondary node. To prevent such frequent switching and to reduce the amount of signaling involved with the switching, the UE may use a secondary node-terminated master cell group (MCG) bearer function, where the MCG may be associated with the first cell. This function may allow a core network to release the secondary cell while maintaining a termination point between the core network and the secondary cell. However, this may increase the signaling between the second cell and the first cell and may result in continued frequent switching as the core network may lack input from the UE. For example, without UE assistance information (UAI) indicating variations on the secondary cell, such as radio frequency conditions, burst traffic, and the like, the UE may continue to switch back and forth between adding and releasing different secondary cells with different termination points, which may result in data interruption and increased bandwidth consumption in the wireless communications system.

Techniques described herein enable the UE to assist in termination selection and secondary cell release and configuration for non-standalone (NSA) or dual connectivity (DC) New Radio (NR) systems. In some cases, the UE may operate in a multi-connectivity mode with at least a first cell (e.g., a master cell), a second cell (e.g., a secondary cell), or one or more other cells (third cell, fourth cell, etc.). The UE may determine a preference for a termination point between a core network and the RAN supporting communications for the UE using the first cell and the second cell. The UE may transmit an indication of the preference of the UE to a base station. In some cases, based on the preference, the base station may determine the secondary node termination point and the base station may transmit a message indicating the determined termination point to the UE. For example, the UE may determine and indicate a preference to release the second cell and move the termination point to the first cell, or the UE may determine and indicate a preference to maintain the termination point at the second cell based on parameters such as a respective coverage area of the first cell or the second cell.

Particular aspects of the subject matter described herein may be implemented to realize one or more advantages. The described techniques may support improvements in UE assisted termination selection and SCG release. For example, in some cases, the described techniques may enable the UE to reduce power and resource consumption by reducing the frequency of switching of a termination point between an MCG and an SCG. As such, supported techniques may include improved network operations, and, in some examples, may promote network efficiencies, among other benefits.

Aspects of the disclosure are initially described in the context of wireless communications systems. Aspects of the disclosure are then described with reference to a process flow. Aspects of the disclosure are further illustrated by and described with reference to apparatus diagrams, system diagrams, and flowcharts that relate to UE assisted termination selection for NSA or DC.

FIG. 1 illustrates an example of a wireless communications system 100 that supports UE assisted termination selection for NSA or DC in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in an NSA mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may assist in termination selection as well as secondary cell release and configuration for NSA or DC NR systems. In some cases, the UE 115 may operate in a multi-connectivity mode with at least a first cell (e.g., a primary cell supported by a master node) and a second cell (e.g., a secondary cell supported by a secondary node). The UE 115 may determine a preference of the UE 115 for a termination point between a core network and a RAN supporting communications for the UE 115 and the UE 115 may transmit an indication of the preference to a base station 105. In some cases, based on the preference of the UE 115, the base station 105 may determine the secondary node termination point and the base station 105 may transmit a message indicating the determined termination point to the UE 115. For example, the UE 115 may determine and indicate a preference to release the second cell and move the termination point to the first cell, or the UE 115 may determine and indicate a preference to maintain the termination point at the second cell based on parameters such as a respective coverage area of the first cell or the second cell.

Figure 2:
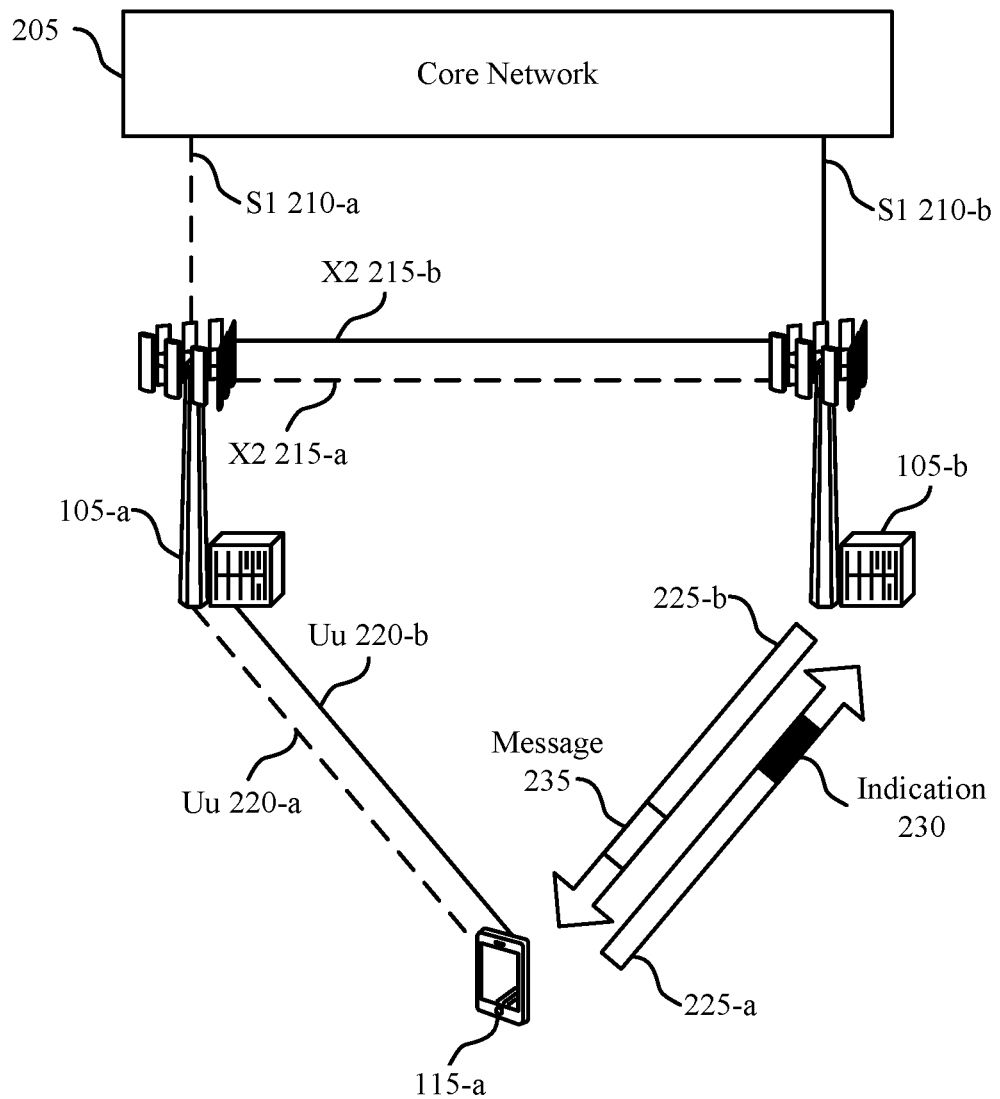
FIGS. 2 and 3 illustrate examples of wireless communications systems that support UE assisted termination selection for NSA or DC in accordance with aspects of the present disclosure.

FIG. 2 illustrates an example of a wireless communications system 200 that supports UE assisted termination selection for NSA or DC in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a base station 105-a, and a base station 105-b, which may be examples of corresponding devices described herein. The wireless communications system 200 may include features for improved communications between the UE 115-a and the base stations 105, among other benefits.

In some cases, a core network 205 (e.g., an EPC network) may support an E-UTRAN New Radio Dual Connectivity (ENDC) or an NR DC system. The core network 205 may include a quantity of ENDC bearers and NR-DC bearers which may be split bearers or non-split bearers. In some cases, a DC bearer in the core network may include an MCG link (e.g., a primary link) and an SCG link (e.g., a secondary link). The core network 205 may include a first set of ENDC bearers including an MCG bearer, an SCG bearer, and a split bearer at a master node, and a second set of NR DC bearers including an MCG bearer, an SCG bearer, and a split bearer at a secondary node. In some cases, each bearer may include a corresponding PDCP layer, RLC layer, and MAC layer, and each bearer may have a termination point with the core network 205 at the master node or the secondary node. For example, the master node and the secondary node may terminate a core network-to-RAN interface such as an S1 210-a (e.g., an S1-user plane (S1-U) interface) or an S1 210-b (e.g., an NG-U interface). In some cases, the S1 210-a may be used for control-plane data and the S1 210-b may be used for user-plane data. In some cases, the node terminating the interface between the core network 205 and the RAN may be the node that executes the bearer split (e.g., in the downlink) and the aggregation of a split bearer (e.g., in the uplink).

The UE 115-a may operate in a multi-connectivity mode with more than one cell. For example, the UE 115-a may communicate with the base station 105-a which may correspond to a first cell (e.g., a master node) and a base station 105-b which may correspond to a second cell (e.g., a secondary node). In some example, the base station 105-a may be an eNodeB (e.g., may support an LTE RAN) and the base station 105-b may be a gNodeB (e.g., may support an NR RAN). In some cases, when the coverage from the base station 105-b (e.g., NR SCG coverage) is discontinuous (e.g., intermittent), the UE 115-a may frequently add or release the base station 105-b (e.g., add or release the base station 105-b multiple times within a given time duration due to the UE 115-a being at the NR coverage edge, for example). As a result, the UE 115-a may frequently switch the PDCP of the corresponding bearer from the base station 105-a (e.g., the master node) and the base station 105-b (e.g., the secondary node). For example, the UE 115-a may frequently add or release the base station 105-b, which may support mmW communications and in some cases may have a smaller coverage area. Each time the UE 115-a adds or releases the base station 105-b, the UE 115-a may move the core network-to-RAN termination point to or from the base station 105-a or the base station 105-b. In some examples, to release the base station 105-b, the UE 115-a may move the core network-to-RAN termination point from the base station 105-b to the base station 105-a. To add the base station 105-b, the UE 115-a may move the termination point back to the base station 105-b (e.g., the SCG). In some cases, the wireless communications system 200 may include more than one secondary node, which may cause additional switching between nodes.

Frequently switching the termination point between the core network 205 and a base station 105 (e.g., corresponding to a RAN) may increase power and resource consumption for the UE 115-a and the core network 205. To mitigate the impact of signaling on the core network 205, the UE 115-a may use a secondary node-terminated MCG bearer function for the secondary node-terminated MCG bearers for user-plane data. In some cases, when the UE 115-a releases the SCG air interface associated with the base station 105-b (e.g., the mmW air interface), the UE 115-a may maintain the interface between the core network 205 and the base station 105-b. As such, the UE 115-a may lack a direct connection with the base station 105-b, however, the UE 115-a may be connected to the base station 105-a. By maintaining the interface between the core network 205 and the base station 105-b, the base station 105-b may receive user-plane data from the core network 205 (e.g., via the S1 210-b) and may communicate that user plane data with the base station 105-a using an X2 215-b interface, but may lack the connection to communicate data with the UE 115-a. In some cases, the base station 105-b and the base station 105-a may also communicate control-plane data via an X2 215-a interface. The base station 105-a may in turn transmit control-plane data from the base station 105-b to the UE 115-a via a Uu 220-a or user-plane data via a Uu 220-b. However, this forwarding of data through the base station 105-a may increase resource consumption over the X2 215-a interface between the base station 105-a and the base station 105-b (e.g., the master node and the secondary node).

In some cases, when the UE 115-a (e.g., an NSA UE) is in the secondary node-terminated MCG bearer state, the UE 115-a may refrain from using NSA DC uplink power control, data splitting, or interference avoidance. That is, the UE 115-a may refrain from transmitting UAI to the base station 105-b to indicate an SCG radio frequency condition and burst traffic. The UE 115-a may continue to frequently switch termination points (e.g., by releasing and adding the base station 105-b as the core network-to-RAN termination point) based on indications from one or more of the base stations 105, which may increase data interruption, packet loss, or other issues. Additionally, or alternatively, the SN-terminated MCG bearer may occupy more bandwidth (e.g., LTE-NR X2 or NR-NR Xn bandwidth) between the base station 105-a and the base station 105-b. In some cases, during a switch of the termination point between the base station 105-*b* to the base station 105-*a*, the UE 115-*a* may be unable to successfully transmit or receive communications with the core network 205.

In some cases, the UE 115-*a* communicate with the base station 105-*b* via a communications link 225-*a* and a communications link 225-*b*. The UE 115-*a* may determine a preference of the UE 115-*a* for a termination point between the core network 205 and a base station 105 (e.g., corresponding to a RAN). The UE 115-*a* may indicate, to the base station 105-*b* and via the communications link 225-*a*, an indication 230 of the preference of the UE 115-*a*. For example, the UE 115-*a* may indicate a secondary node-terminated MCG or an SCG release, where the interface between the core network and a RAN may be terminated at the base station 105-*b*.

The base station 105-*b* (e.g., or the base station 105-*a*) may receive the indication 230 of the preference of the UE 115-*a* for a termination point between the core network 205 and a RAN. Based on the indication 230 and the preference of the UE 115-*a*, the base station 105-*b* may determine the termination point. For example, the base station 105-*b* may determine to terminate the connection with the core network at the base station 105-*a* or the base station 105-*b*. The base station 105-*b* may also determine network conditions such as the frequency of SCG addition and release, X2 bandwidth usage between the base station 105-*a* and the base station 105-*b*, and a time duration for maintaining the termination point. The base station 105-*b* may transmit a message 235 indicating a configuration for the multi-connectivity mode of the UE 115-*a*, where the configuration may indicate the determined termination point. The UE assisted termination point selection and SCG release process is described in more detail with reference to FIG. 3. By using the preference of the UE 115-*a* to determine and configure a termination point, the UE 115-*a* and the base stations 105 may increase the speed of split bearer setup, SCG release, SCG dormancy, or a combination thereof for power savings at the UE 115-*a*.

Figure 3:
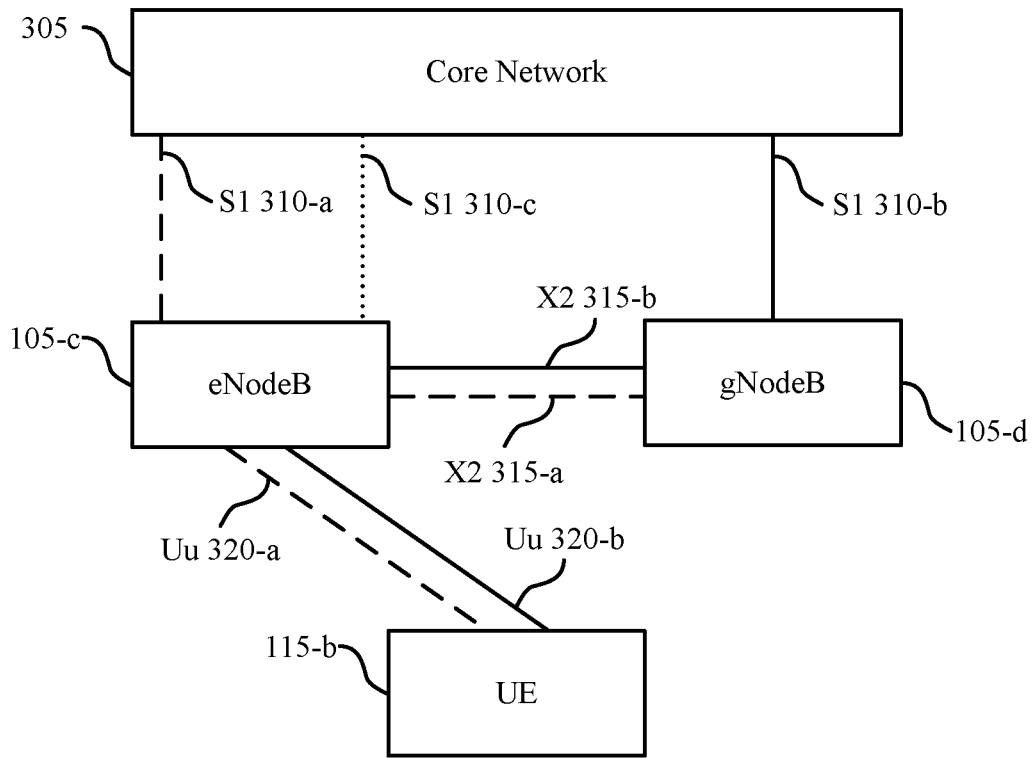

FIG. 3 illustrates an example of a wireless communications system 300 that supports UE assisted termination selection for NSA or DC in accordance with aspects of the present disclosure. In some examples, the wireless communications system 300 may implement aspects of the wireless communications systems 100 and 200 or may be implemented by aspects of the wireless communications systems 100 and 200. For example, the wireless communications system 300 may include a UE 115-*b*, a base station 105-*c*, and a base station 105-*d*, which may be examples of corresponding devices described herein.

In this example, the UE 115-*b* may operate in a multi-connectivity mode with more than one cell. For instance, the UE 115-*b* may communicate with the base station 105-*c* which may correspond to a first cell (e.g., a primary cell supported by a master node) and a base station 105-*d* which may correspond to a second cell (e.g., a secondary cell supported by a secondary node). In some example, the base station 105-*c* may be an eNodeB (e.g., may support an LTE RAN) and the base station 105-*d* may be a gNodeB (e.g., may support an NR RAN). The UE 115-*b* may determine a preference of the UE 115-*b* for a termination point between a core network 305 and a base station 105 (e.g., corresponding to a RAN). The UE 115-*b* may indicate, to the base station 105-*d*, an indication of the preference of the UE 115-*b*. For example, the UE 115-*b* may indicate a secondary node-terminated MCG or an SCG release, where the interface between the core network 305 and a RAN may be terminated at the base station 105-*d*. In some cases, the UE 115-*b* may transmit the indication via an RRC message or a MAC-CE. The UE 115-*b* may indicate the preference based on an SCG radio frequency variation, application traffic throughput, application traffic latency, or a combination thereof. For example, the UE 115-*b* may determine that base station 105-*c* is a UE preference for a termination point based on latency standards for application traffic of the UE 115-*b* because base station 105-*c* meets the latency standards for the application traffic. In some cases, the UE 115-*b* may also consider a total bandwidth between the base station 105-*c* and the base station 105-*d*. For example, if the base station 105-*c* operates at 10 MHz and the base station 105-*d* operates at 100 MHz, the UE 115-*b* may indicate a preference for the termination point at the base station 105-*d*.

In some cases, the UE 115-*b* may indicate the preference in an ENDC system, an NR DC system, or in a multi-connectivity system (e.g., which may include multiple SCGs). Additionally, or alternatively, the UE 115-*b* may indicate the preference for an NSA system, an FR1+FR2 DC system, or an FR1+FR1 DC. In some cases, if there is a split bearer, the UE 115-*b* may refrain from releasing the base station 105-*d*, and the UE 115-*b* may indicate the preference of the termination point to the base station 105-*c*, the base station 105-*c*, or both. If there are multiple SCGs, the UE 115-*b* may also transmit the indication to one or more base stations 105 corresponding to an SCG. In some cases, the UE 115-*b* may be pre-configured (e.g., by a network) to transmit the UAI via the indication, and in some cases, the UE 115-*b* may have a UE capability to transmit the UAI based on a number of parameters.

In some cases, the UE 115-*b* may determine the preference for the termination point between the core network 305 and a RAN using a measurement report. For example, the UE 115-*b* may transmit a measurement report indicating an SCG failure, and based on the measurement report, the UE 115-*b* may determine a preference to release the base station 105-*d*. At the same time, the UE 115-*b* may add an additional information element to the indication indicating to maintain the interface between the core network 305 and the base station 105-*d* if the UE 115-*b* may have knowledge of future coverage by the base station 105-*d*. In some cases, the base station 105-*d* may determine the termination point after receiving the measurement report from the UE 115-*b*, which may indicate the coverage area of the base station 105-*d*. The core network 305 may release the base station 105-*d* and may maintain the termination point between the core network 305 and the base station 105-*b* (e.g., master node termination bearer). The base station 105-*d* may receive a measurement report from the UE 115-*b* indicating that the UE 115-*b* may move into a 5G coverage area (e.g., the coverage area supported by the base station 105-*d*). If the buffer size or throughput at the base station 105-*d* is greater than a threshold value, the base station 105-*d* may move the termination point to the base station 105-*d*.

In some cases, the UE 115-*b* may have a preference to refrain from releasing the base station 105-*d*. As such, the UE 115-*b* may transmit the indication of a preference for the termination from the core network 305 to the base station 105-*c* or the base station 105-*d*. In some cases, the indication may also include whether the base station 105-*d* is in a dormant mode. For example, the UE 115-*b* may maintain a communications link (e.g., a Uu 320) with the base station 105-*d* instead of releasing the base station 105-*d*. However, the communications link may be dormant such that the UE 115-*b* may refrain from monitoring for data from the base station 105-*d* via the communications link. In some cases, the UE 115-*b* may easily activate the communications link (e.g., from the dormant mode) to receive any data transmissions from the base station 105-d.

In some examples, the indication may also include an indication of a timer interval for keeping the secondary node or master node-terminated MCG bearer. For example, if the UE 115-b has a preference to release the base station 105-d, or if the base station 105-d is in the dormant mode, the UE 115-b may indicate how long to maintain the termination point between the core network 305 and the base station 105-d. After the indicated time interval, the core network 305 may move the termination point from the base station 105-d to the base station 105-c, so as to avoid sending too much data between the base station 105-d and the base station 105-c via an X2 315-b (e.g., since all data may be communicated between the base station 105-d and the UE 115-b via a Uu 320-b).

The base station 105-d (e.g., or the base station 105-c) may receive the indication of the preference of the UE 115-b for a termination point between the core network 305 and a RAN. Based on the indication and the preference of the UE 115-b, the base station 105-d may determine the termination point. For example, the base station 105-d may determine to terminate the connection with the core network at the base station 105-c or the base station 105-d. The base station 105-d may also determine network conditions such as the frequency of SCG addition and release, X2 bandwidth usage between the base station 105-c and the base station 105-d, and a time duration for maintaining the termination point. The base station 105-d may transmit a message indicating a configuration for the multi-connectivity mode of the UE 115-b, where the configuration may indicate the determined termination point. By using the preference of the UE 115-b to determine and configure a termination point, the UE 115-b and the base stations 105 may increase the speed of split bearer setup, SCG release, SCG dormancy, or a combination thereof for power savings at the UE 115-b.

In some examples, the UE 115-b may indicate a preference of the UE 115-b for a termination point between the core network 305 and the base station 105-d. The core network 305 and the base station 105-d may communicate user-plane data via an S1 310-b, and in some cases, the core network 305 and the base station 105-c may communicate control-plane data via an S1 310-a. In some cases, the base station 105-d and the base station 105-c may communicate user-plane data via the X2 315-b and control-plane data via an X2 315-a. In some cases, the base station 105-a and the UE 115-b may then communicate user-plane data via the Uu 320-b and control-plane data via a Uu 320-a. In some cases, the UE 115-b may determine a preference for a termination point between the core network 305 and the base station 105-c (e.g., instead of the base station 105-d) to reduce the amount of X2 signaling that may occur between the base stations 105. The UE 115-b may indicate the preference and the termination point may switch from the base station 105-d to the base station 105-c. For example, the core network 305 and the base station 105-c may communicate via an S1 310-c, which may be based on the preference of the UE 115-b instead of a quality of the base station 105 (e.g., as indicated by the core network 305). As such, the UE 115-b may reduce excessive signaling between the base stations 105 and improve power consumption.

Figure 4:
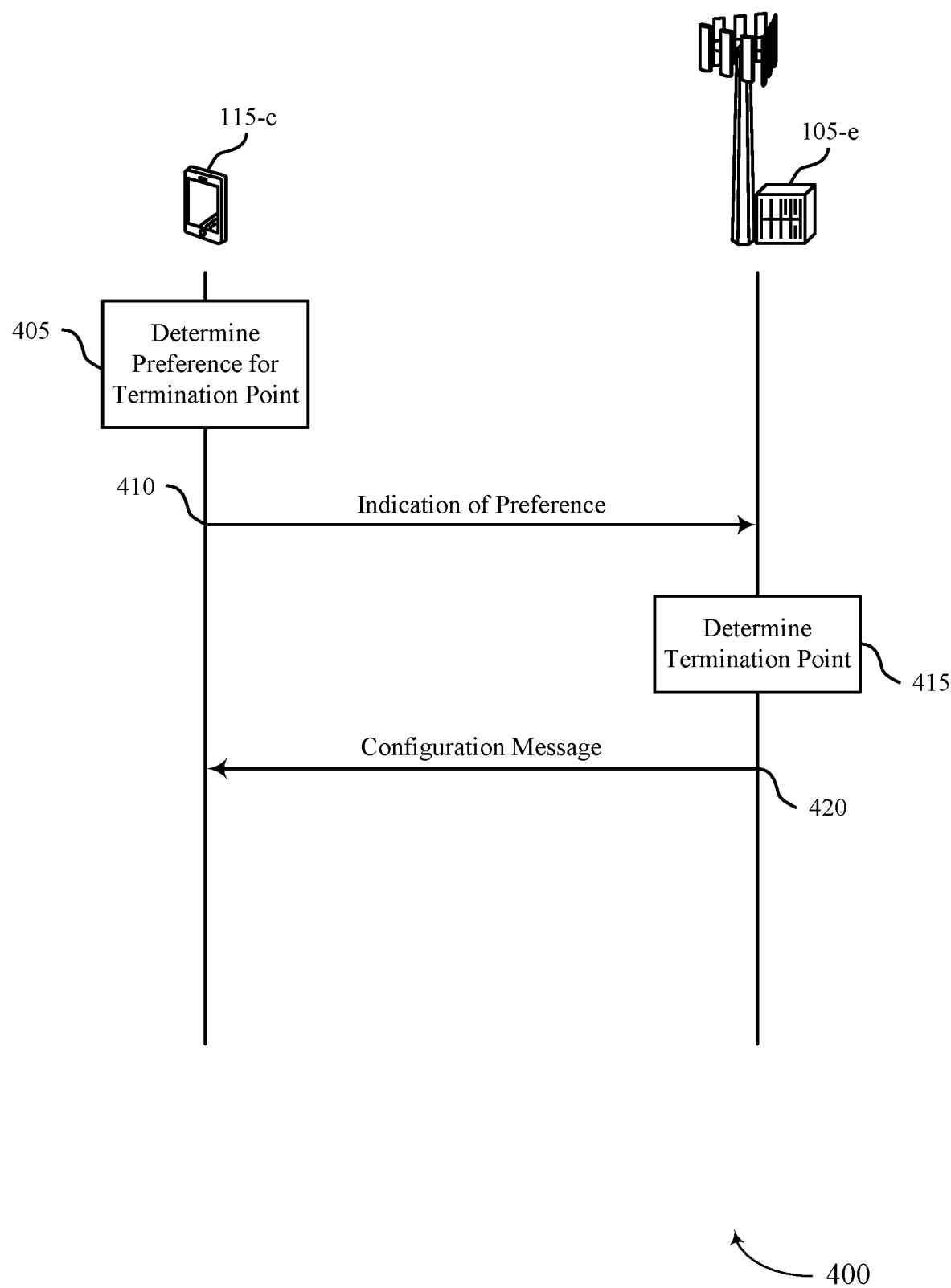
FIG. 4 illustrates an example of a process flow that supports UE assisted termination selection for NSA or DC in accordance with aspects of the present disclosure.

FIG. 4 illustrates an example of a process flow 400 that supports UE assisted termination selection for NSA or DC in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 115-c and a base station 105-e, which may be examples of corresponding devices described with reference to FIGS. 1, 2, and 3. In the following description of the process flow 400, the operations between the UE 115-c and the base station 105-e may be transmitted in a different order than the example order shown, or the operations performed by the UE 115-c and the base station 105-e may be performed in different orders or at different times. Some operations may also be omitted from the process flow 400, and other operations may be added to the process flow 400.

At 405, the UE 115-c may determine a preference of the UE 115-c for a termination point between a core network and a RAN, the core network and the RAN supporting communications for the UE via at least one of a first cell associated with a multi-connectivity mode of the UE 115-c and a second cell associated with the multi-connectivity mode of the UE 115-c. For example, the RAN may support LTE or NR communications. In some cases, the UE 115-c may determine the preference based on a measurement report, which may indicate the coverage of the RAN.

At 410, the UE 115-c may transmit, to the base station 105-e, an indication of the preference of the UE 115-c for the termination point based on the determining. The UE 115-c may transmit the indication via RRC signaling or a MAC-CE.

At 415, the base station 105-e may determine the termination point between the core network and the RAN based on receiving the indication of the preference of the UE 115-c. For example, the base station 105-e may determine to release an SCG and move the termination point to an MCG, or the base station 105-e may determine to maintain the termination point at the SCG.

At 420, the UE 115-c may receive, from the base station 105-e, a message indicating a configuration for the multi-connectivity mode, the configuration indicating the determined termination point. For example, the indication may indicate the SCG or the MCG as the determined termination point based on channel conditions, the reliability of coverage, and the like.

Figure 5:
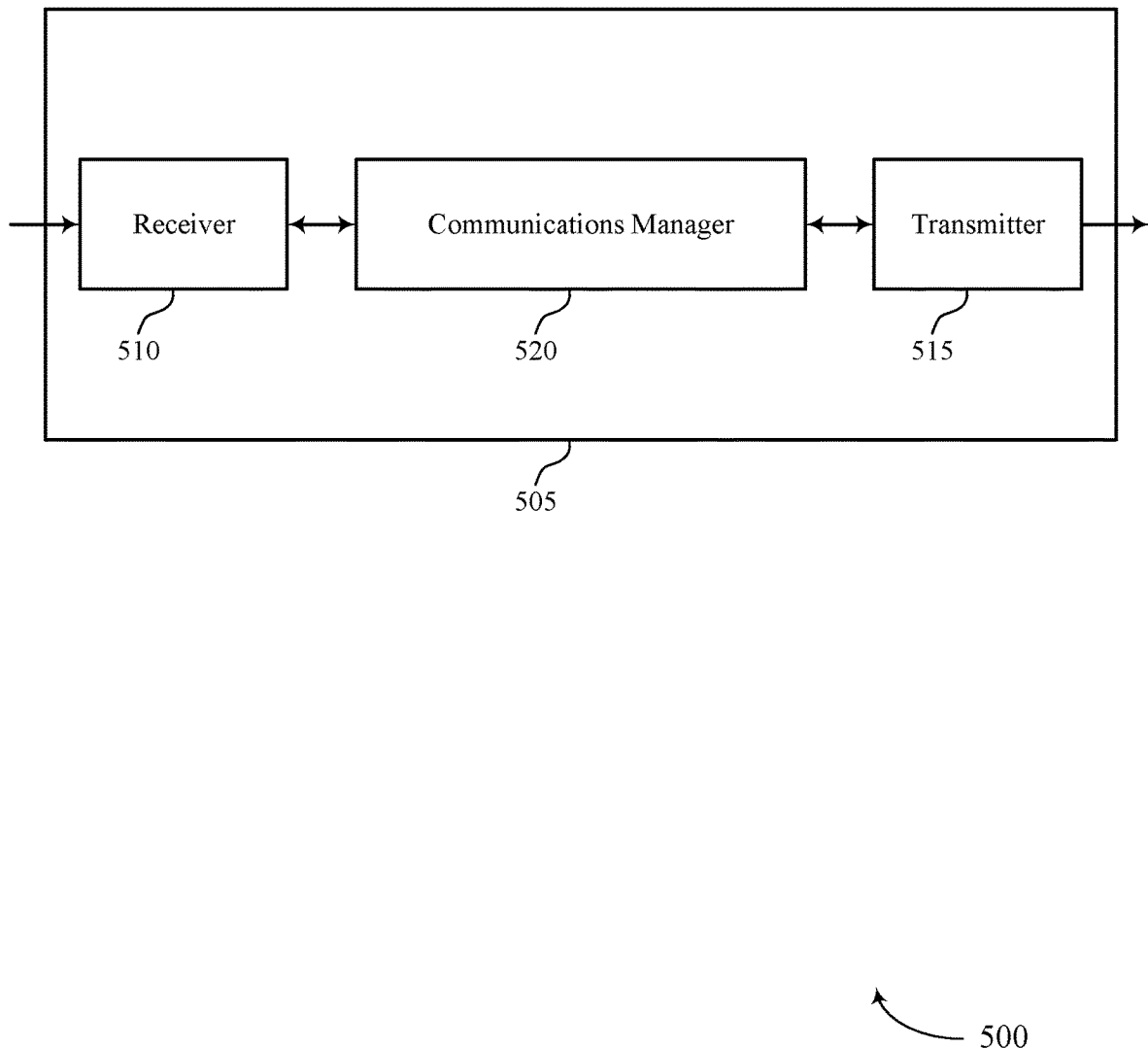
FIGS. 5 and 6 show block diagrams of devices that support UE assisted termination selection for NSA or DC in accordance with aspects of the present disclosure.

FIG. 5 shows a block diagram 500 of a device 505 that supports UE assisted termination selection for NSA or DC in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE assisted termination selection for NSA or DC). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE assisted termination selection for NSA or DC). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of UE assisted termination selection for NSA or DC as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory in electronic communication with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE. The communications manager 520 may be configured as or otherwise support a means for transmitting, to a base station, an indication of the preference of the UE for the termination point based on the determining.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for UE assisted termination selection for NSA and DC systems which may reduce power and resource consumption between a UE and one or more base stations.

Figure 6:
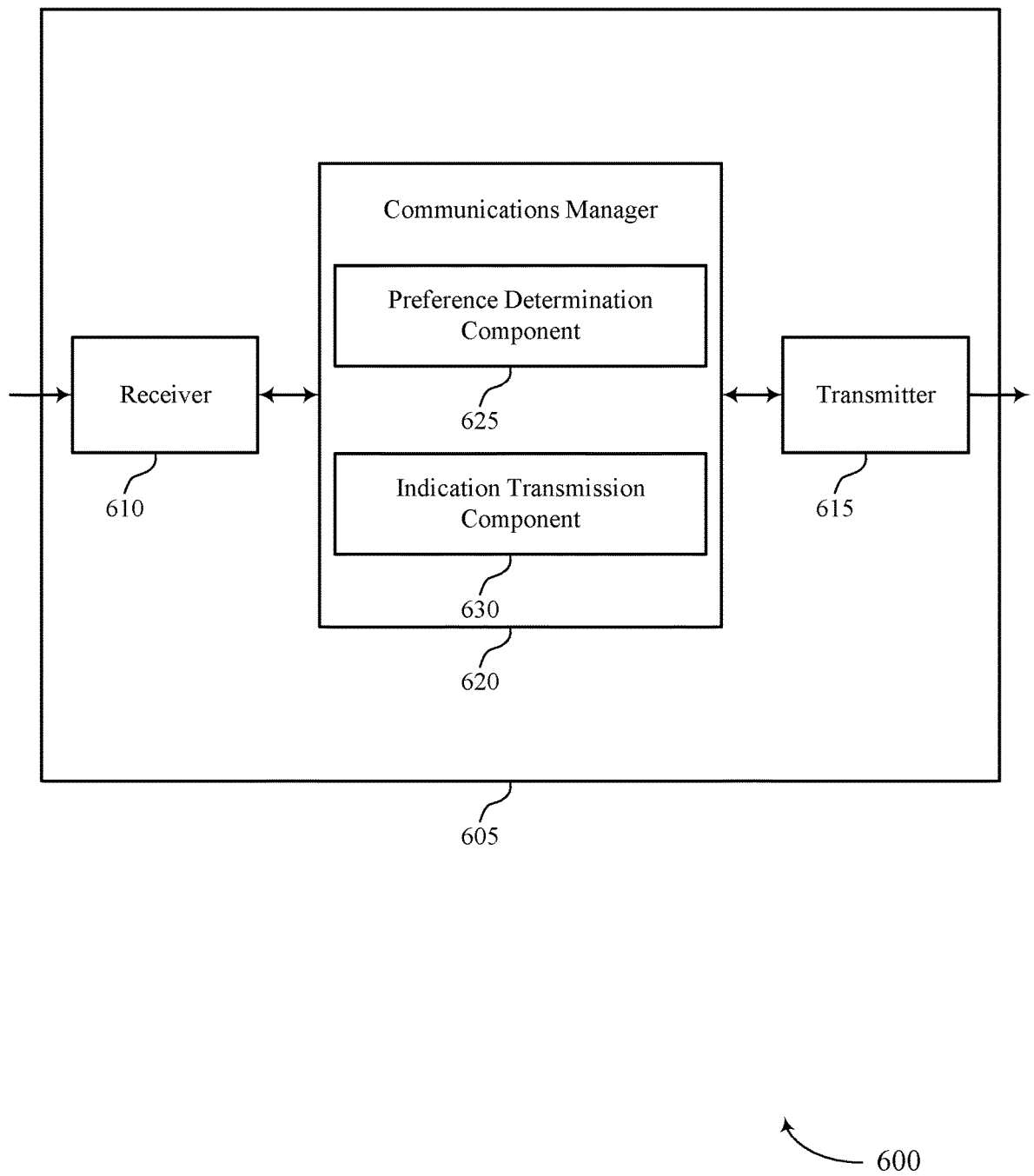

FIG. 6 shows a block diagram 600 of a device 605 that supports UE assisted termination selection for NSA or DC in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE assisted termination selection for NSA or DC). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE assisted termination selection for NSA or DC). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of UE assisted termination selection for NSA or DC as described herein. For example, the communications manager 620 may include a preference determination component 625 an indication transmission component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The preference determination component 625 may be configured as or otherwise support a means for determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE. The indication transmission component 630 may be configured as or otherwise support a means for transmitting, to a base station, an indication of the preference of the UE for the termination point based on the determining.

Figure 7:
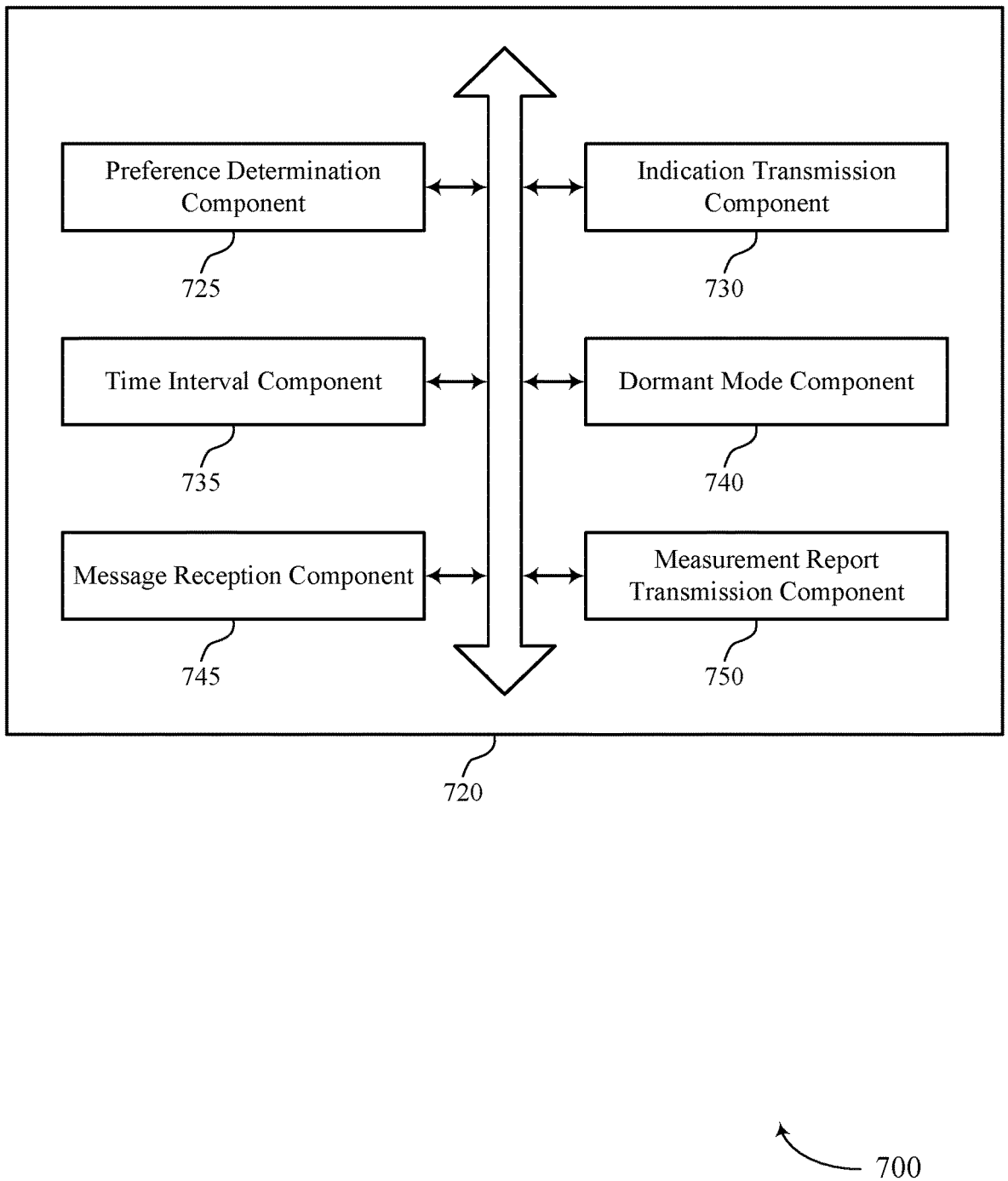
FIG. 7 shows a block diagram of a communications manager that supports UE assisted termination selection for NSA or DC in accordance with aspects of the present disclosure.

FIG. 7 shows a block diagram 700 of a communications manager 720 that supports UE assisted termination selection for NSA or DC in accordance with aspects of the present disclosure. The communications manager 720 may be an example of aspects of a communications manager 520, a communications manager 620, or both, as described herein. The communications manager 720, or various components thereof, may be an example of means for performing various aspects of UE assisted termination selection for NSA or DC as described herein. For example, the communications manager 720 may include a preference determination component 725, an indication transmission component 730, a time interval component 735, a dormant mode component 740, a message reception component 745, a measurement report transmission component 750, or any combination thereof. Each of these components may communicate, directly or indirectly, with one another (e.g., via one or more buses).

The communications manager 720 may support wireless communications at a UE in accordance with examples as disclosed herein. The preference determination component 725 may be configured as or otherwise support a means for determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE. The indication transmission component 730 may be configured as or otherwise support a means for transmitting, to a base station, an indication of the preference of the UE for the termination point based on the determining.

In some examples, to support determining the preference of the UE for the termination point between the core network and the RAN, the preference determination component 725 may be configured as or otherwise support a means for determining, by the UE in the multi-connectivity mode with at least the first cell and the second cell, the preference of the UE for the termination point as one of a secondary node termination point, a master node termination point, or an SCG release.

In some examples, to support determining the preference of the UE for the termination point between the core network and the RAN, the preference determination component 725 may be configured as or otherwise support a means for determining, by the UE in the multi-connectivity mode with at least the first cell and the second cell, the preference of the UE for the termination point based on a radio frequency variation of the second cell, application traffic throughput associated with one of the first cell or the second cell, a latency associated with one of the first cell or the second cell, or a combination thereof.

In some examples, the time interval component 735 may be configured as or otherwise support a means for determining, by the UE in the multi-connectivity mode with at least the first cell and the second cell, a time interval for using the termination point between the core network and the RAN indicated by the preference of the UE. In some examples, the time interval component 735 may be configured as or otherwise support a means for transmitting an indication of the time interval to the base station.

In some examples, the time interval component 735 may be configured as or otherwise support a means for determining, by the UE in the multi-connectivity mode with at least the first cell and the second cell, a time interval for using a current termination point between the core network and the RAN. In some examples, the time interval component 735 may be configured as or otherwise support a means for transmitting an indication of the time interval to the base station.

In some examples, the dormant mode component 740 may be configured as or otherwise support a means for determining, by the UE in the multi-connectivity mode with at least the first cell and the second cell, a time interval for the UE to operate in a dormant mode with the second cell based on the preference of the UE for the termination point being the first cell. In some examples, the dormant mode component 740 may be configured as or otherwise support a means for transmitting an indication of the time interval to the base station.

In some examples, the message reception component 745 may be configured as or otherwise support a means for receiving, from the base station, a message indicating a configuration for the multi-connectivity mode, the configuration indicating one of a secondary node termination point, a master node termination point, or an SCG release based on the indication of the preference of the UE.

In some examples, the measurement report transmission component 750 may be configured as or otherwise support a means for transmitting, by the UE, a measurement report indicating one or more measurements associated with the second cell, where the message indicating the configuration for the multi-connectivity mode is received based on the measurement report.

In some examples, to support transmitting the indication of the preference of the UE for the termination point, the indication transmission component 730 may be configured as or otherwise support a means for transmitting the indication of the preference of the UE for the termination point via RRC signaling or a MAC-CE.

In some examples, the termination point corresponds to a master node associated with the first cell or a secondary node associated with the second cell. In some examples, the UE is operating in an NSA mode, a DC mode, or the multi-connectivity mode.

Figure 8:
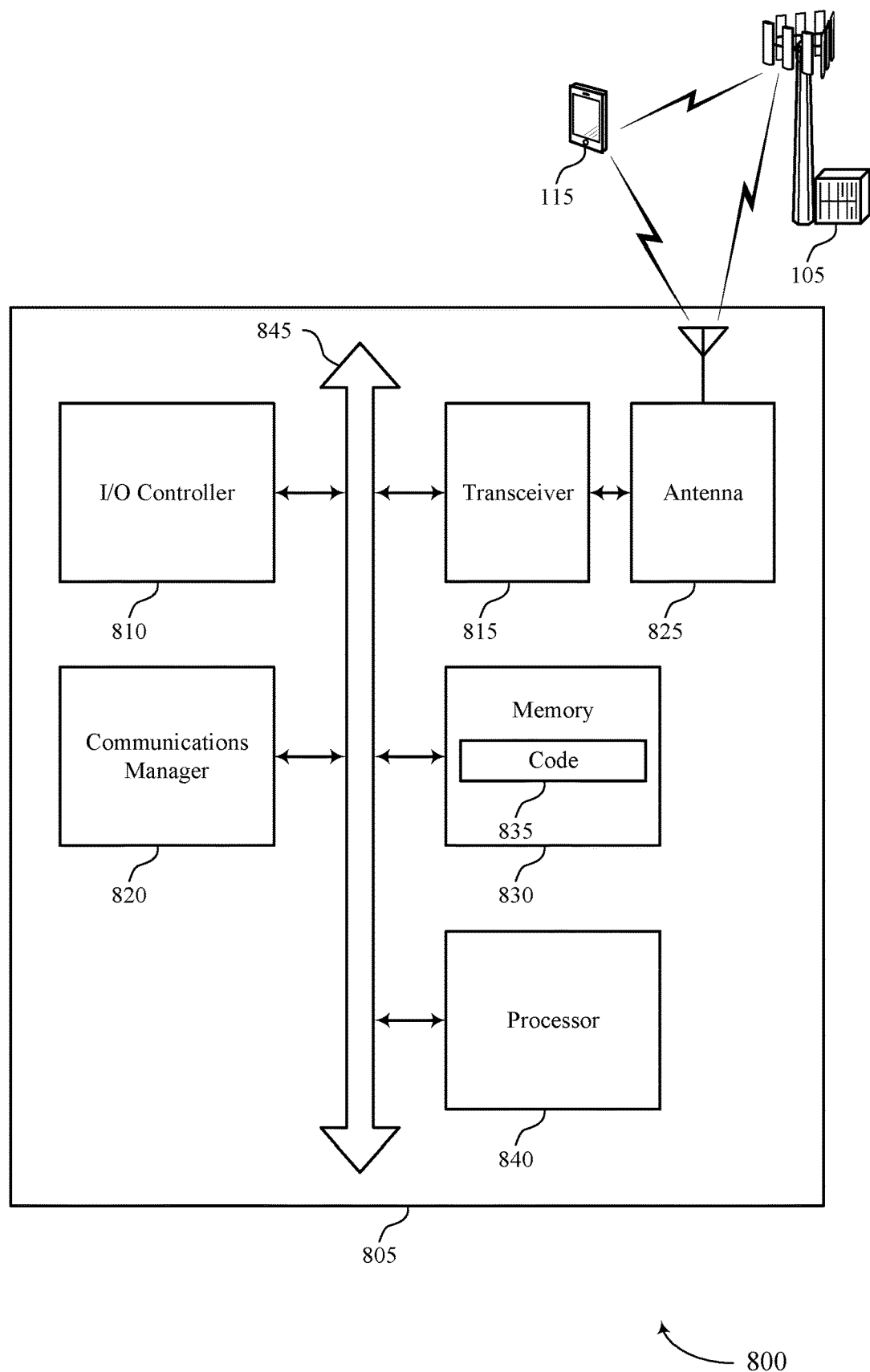
FIG. 8 shows a diagram of a system including a device that supports UE assisted termination selection for NSA or DC in accordance with aspects of the present disclosure.

FIG. 8 shows a diagram of a system 800 including a device 805 that supports UE assisted termination selection for NSA or DC in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting UE assisted termination selection for NSA or DC). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE. The communications manager 820 may be configured as or otherwise support a means for transmitting, to a base station, an indication of the preference of the UE for the termination point based on the determining.

By including or configuring the communications manager 820 in accordance with examples as described herein, the device 805 may support techniques for UE assisted termination selection for NSA and DC systems, which may reduce power and resource consumption between a UE and one or more base stations. For example, UE assisted termination selection techniques described herein may reduce packet or connection loss at a given UE, which may in turn reduce the number of retransmissions and lost data resulting in power savings and increased battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of UE assisted termination selection for NSA or DC as described herein, or the processor 840 and the memory 830 may be otherwise configured to perform or support such operations.

Figure 9:
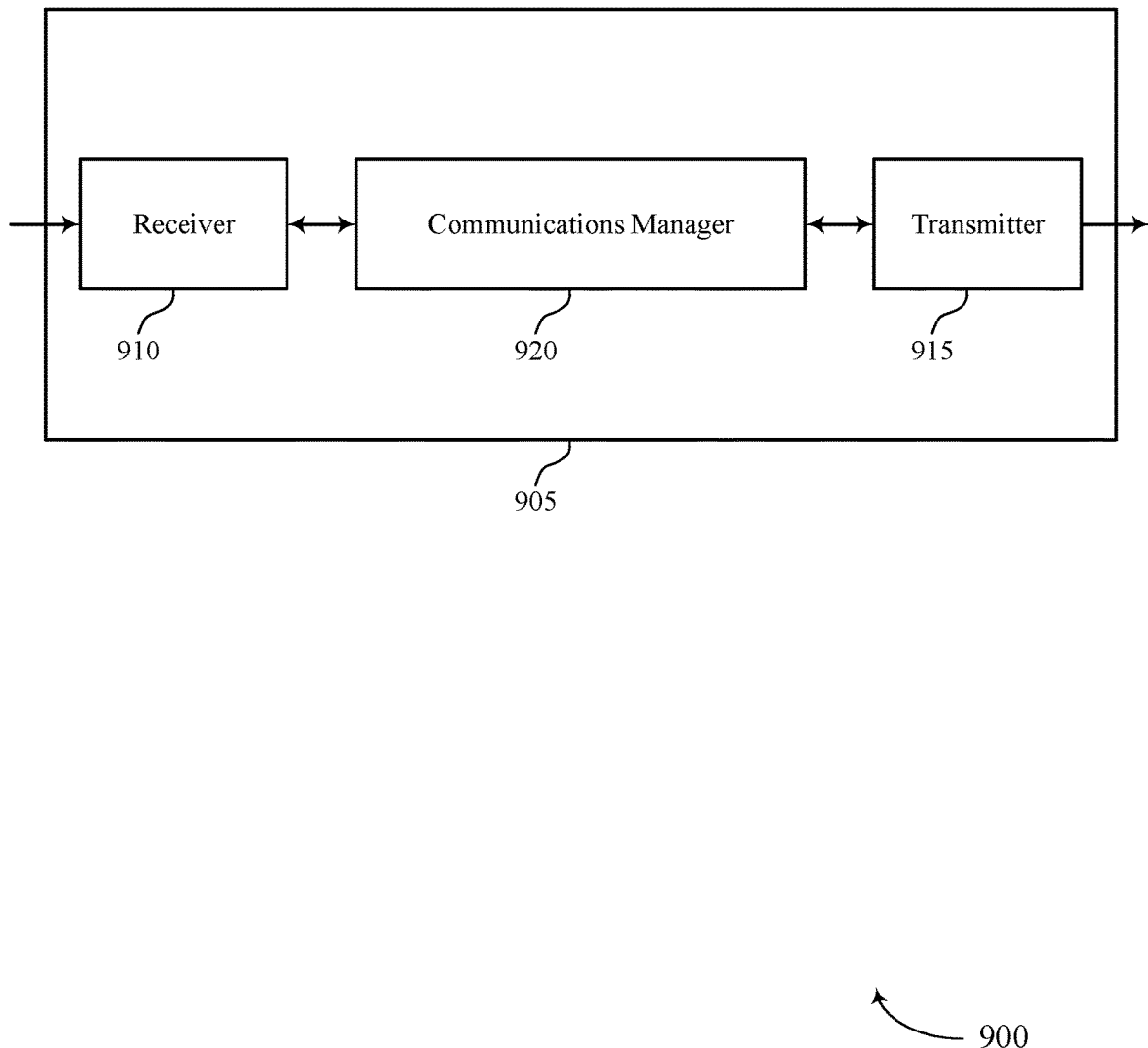
FIGS. 9 and 10 show block diagrams of devices that support UE assisted termination selection for NSA or DC in accordance with aspects of the present disclosure.

FIG. 9 shows a block diagram 900 of a device 905 that supports UE assisted termination selection for NSA or DC in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to UE assisted termination selection for NSA or DC). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to UE assisted termination selection for NSA or DC). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of UE assisted termination selection for NSA or DC as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory in electronic communication with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The communications manager 920 may be configured as or otherwise support a means for determining the termination point between the core network and the RAN based on receiving the indication of the preference of the UE. The communications manager 920 may be configured as or otherwise support a means for transmitting a message indicating a configuration for the multi-connectivity mode, the configuration indicating the determined termination point.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for UE assisted termination selection for NSA and DC systems which may reduce power and resource consumption between a UE and one or more base stations.

Figure 10:
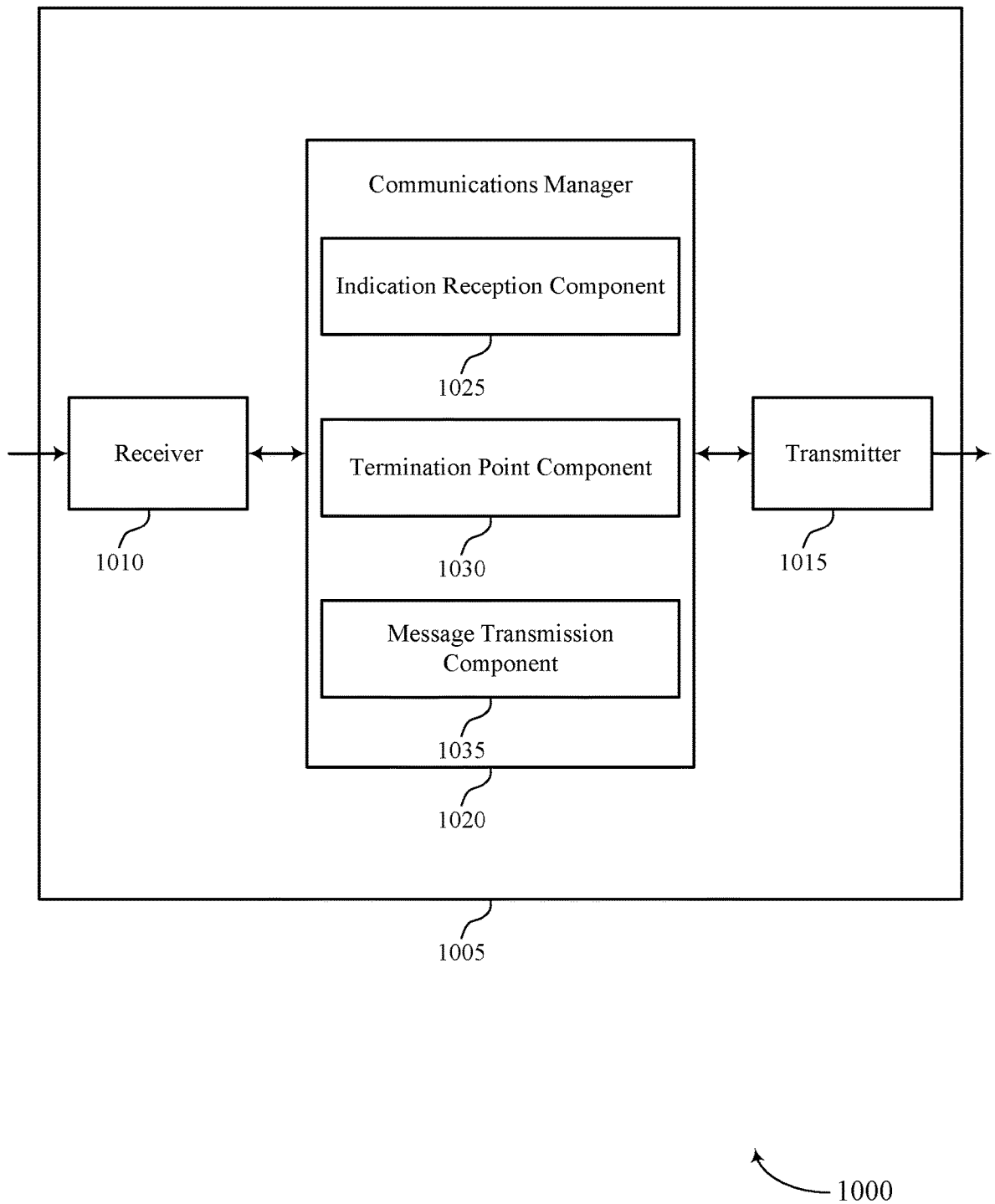

FIG. 10 shows a block diagram 1000 of a device 1005 that supports UE assisted termination selection for NSA or DC in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to UE assisted termination selection for NSA or DC). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to UE assisted termination selection for NSA or DC). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of UE assisted termination selection for NSA or DC as described herein. For example, the communications manager 1020 may include an indication reception component 1025, a termination point component 1030, a message transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The indication reception component 1025 may be configured as or otherwise support a means for receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The termination point component 1030 may be configured as or otherwise support a means for determining the termination point between the core network and the RAN based on receiving the indication of the preference of the UE. The message transmission component 1035 may be configured as or otherwise support a means for transmitting a message indicating a configuration for the multi-connectivity mode, the configuration indicating the determined termination point.

Figure 11:
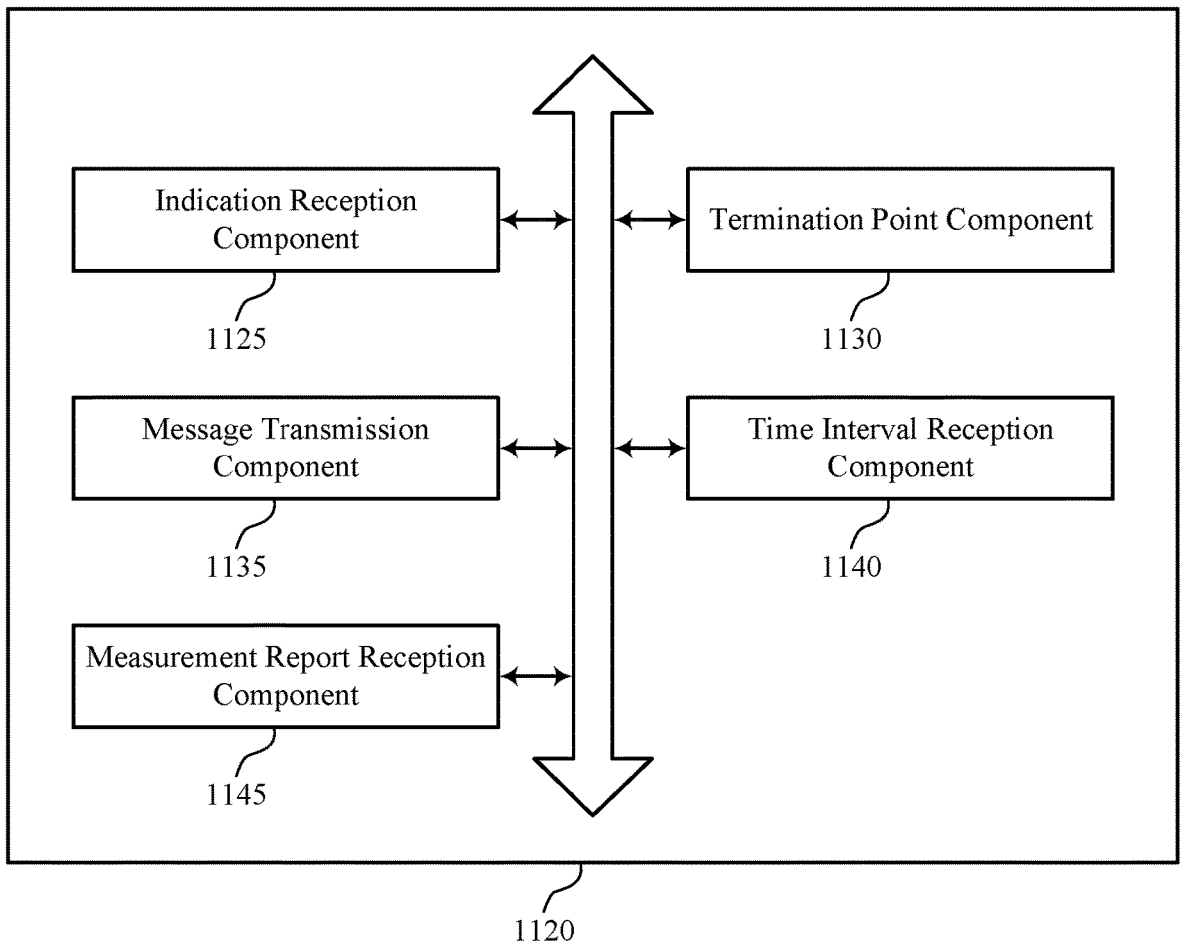
FIG. 11 shows a block diagram of a communications manager that supports UE assisted termination selection for NSA or DC in accordance with aspects of the present disclosure.

FIG. 11 shows a block diagram 1100 of a communications manager 1120 that supports UE assisted termination selection for NSA or DC in accordance with aspects of the present disclosure. The communications manager 1120 may be an example of aspects of a communications manager 920, a communications manager 1020, or both, as described herein. The communications manager 1120, or various components thereof, may be an example of means for performing various aspects of UE assisted termination selection for NSA or DC as described herein. For example, the communications manager 1120 may include an indication reception component 1125, a termination point component 1130, a message transmission component 1135, a time interval reception component 1140, a measurement report reception component 1145, or any combination thereof. Each of these components may communicate, directly or indirectly, with one another (e.g., via one or more buses).

The communications manager 1120 may support wireless communications at a base station in accordance with examples as disclosed herein. The indication reception component 1125 may be configured as or otherwise support a means for receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The termination point component 1130 may be configured as or otherwise support a means for determining the termination point between the core network and the RAN based on receiving the indication of the preference of the UE. The message transmission component 1135 may be configured as or otherwise support a means for transmitting a message indicating a configuration for the multi-connectivity mode, the configuration indicating the determined termination point.

In some examples, to support determining the termination point between the core network and the RAN, the termination point component 1130 may be configured as or otherwise support a means for determining the termination point based on a switching frequency between secondary cell addition and secondary cell release, a bandwidth usage of one or more backhaul links associated with the base station, the first cell, or the second cell, a time duration associated with a current termination point, or any combination thereof.

In some examples, the time interval reception component 1140 may be configured as or otherwise support a means for receiving, from the UE, an indication of a time interval for using the termination point between the core network and the RAN indicated by the preference of the UE. In some examples, the termination point component 1130 may be configured as or otherwise support a means for determining the termination point based on the time interval.

In some examples, the time interval reception component 1140 may be configured as or otherwise support a means for receiving, from the UE, an indication of a time interval for using a current termination point between the core network and the RAN indicated by the preference of the UE. In some examples, the termination point component 1130 may be configured as or otherwise support a means for determining the termination point based on the time interval.

In some examples, the time interval reception component 1140 may be configured as or otherwise support a means for receiving, from the UE, an indication of a time interval for the UE to operate in a dormant mode with the second cell based on the preference of the UE. In some examples, the termination point component 1130 may be configured as or otherwise support a means for determining the termination point based on the time interval.

In some examples, the measurement report reception component 1145 may be configured as or otherwise support a means for receiving, from the UE, a measurement report indicating one or more measurements associated with the second cell. In some examples, the termination point component 1130 may be configured as or otherwise support a means for determining the termination point based on the measurement report.

In some examples, to support receiving the indication of the preference of the UE, the indication reception component 1125 may be configured as or otherwise support a means for receiving the indication of the preference of the UE for the termination point via RRC signaling or a MAC-CE.

In some examples, the configuration indicates one of a secondary node termination point, a master node termination point, or an SCG release based on the indication of the preference of the UE. In some examples, the preference of the UE for the termination point is one of a secondary node termination point, a master node termination point, or an SCG release.

In some examples, the preference of the UE for the termination point is based on a radio frequency variation of the second cell, application traffic throughput associated with one of the first cell or the second cell, a latency associated with one of the first cell or the second cell, or a combination thereof. In some examples, the termination point corresponds to a master node associated with the first cell or a secondary node associated with the second cell.

Figure 12:
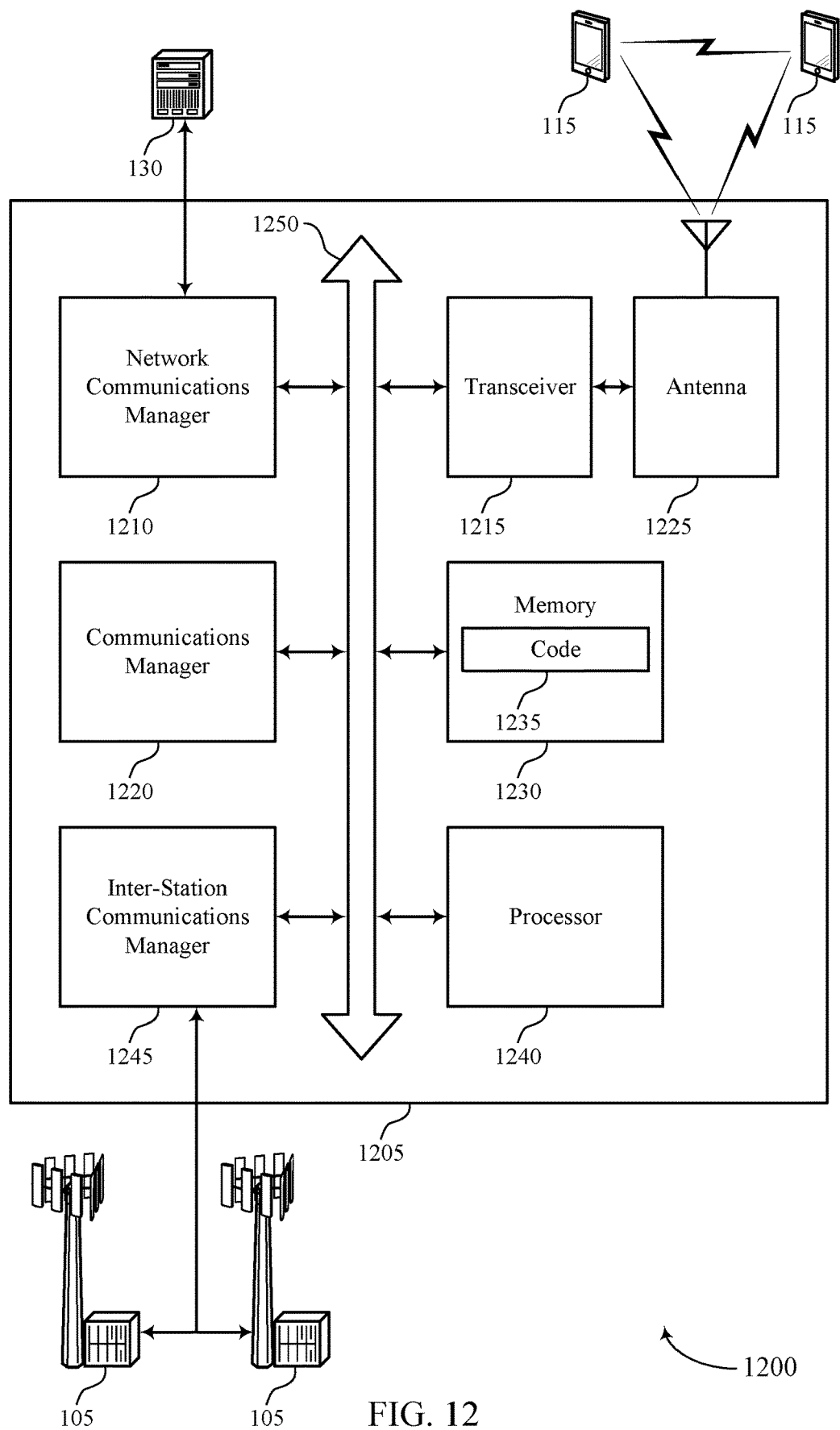
FIG. 12 shows a diagram of a system including a device that supports UE assisted termination selection for NSA or DC in accordance with aspects of the present disclosure.

FIG. 12 shows a diagram of a system 1200 including a device 1205 that supports UE assisted termination selection for NSA or DC in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting UE assisted termination selection for NSA or DC). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The communications manager 1220 may be configured as or otherwise support a means for determining the termination point between the core network and the RAN based on receiving the indication of the preference of the UE. The communications manager 1220 may be configured as or otherwise support a means for transmitting a message indicating a configuration for the multi-connectivity mode, the configuration indicating the determined termination point.

By including or configuring the communications manager 1220 in accordance with examples as described herein, the device 1205 may support techniques for UE assisted termination selection for NSA and DC systems which may reduce power and resource consumption between a UE and one or more base stations.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of UE assisted termination selection for NSA or DC as described herein, or the processor 1240 and the memory 1230 may be otherwise configured to perform or support such operations.

Figure 13:
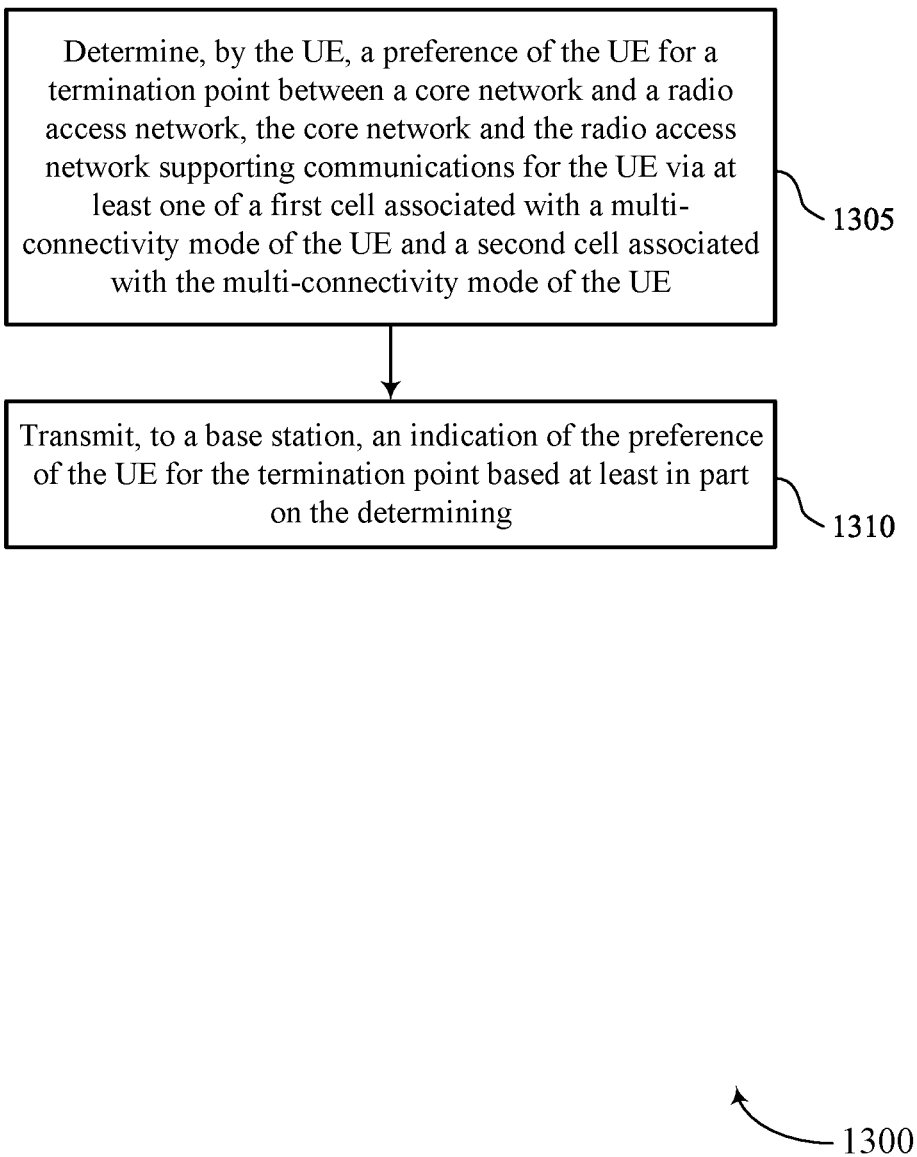
FIGS. 13 through 17 show flowcharts illustrating methods that support UE assisted termination selection for NSA or DC in accordance with aspects of the present disclosure.

FIG. 13 shows a flowchart illustrating a method 1300 that supports UE assisted termination selection for NSA or DC in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE. The operations of 1305 may be performed in accordance with examples as disclosed herein. In some examples, aspects of the operations of 1305 may be performed by a preference determination component 725 as described with reference to FIG. 7.

At 1310, the method may include transmitting, to a base station, an indication of the preference of the UE for the termination point based on the determining. The operations of 1310 may be performed in accordance with examples as disclosed herein. In some examples, aspects of the operations of 1310 may be performed by an indication transmission component 730 as described with reference to FIG. 7.

Figure 14:
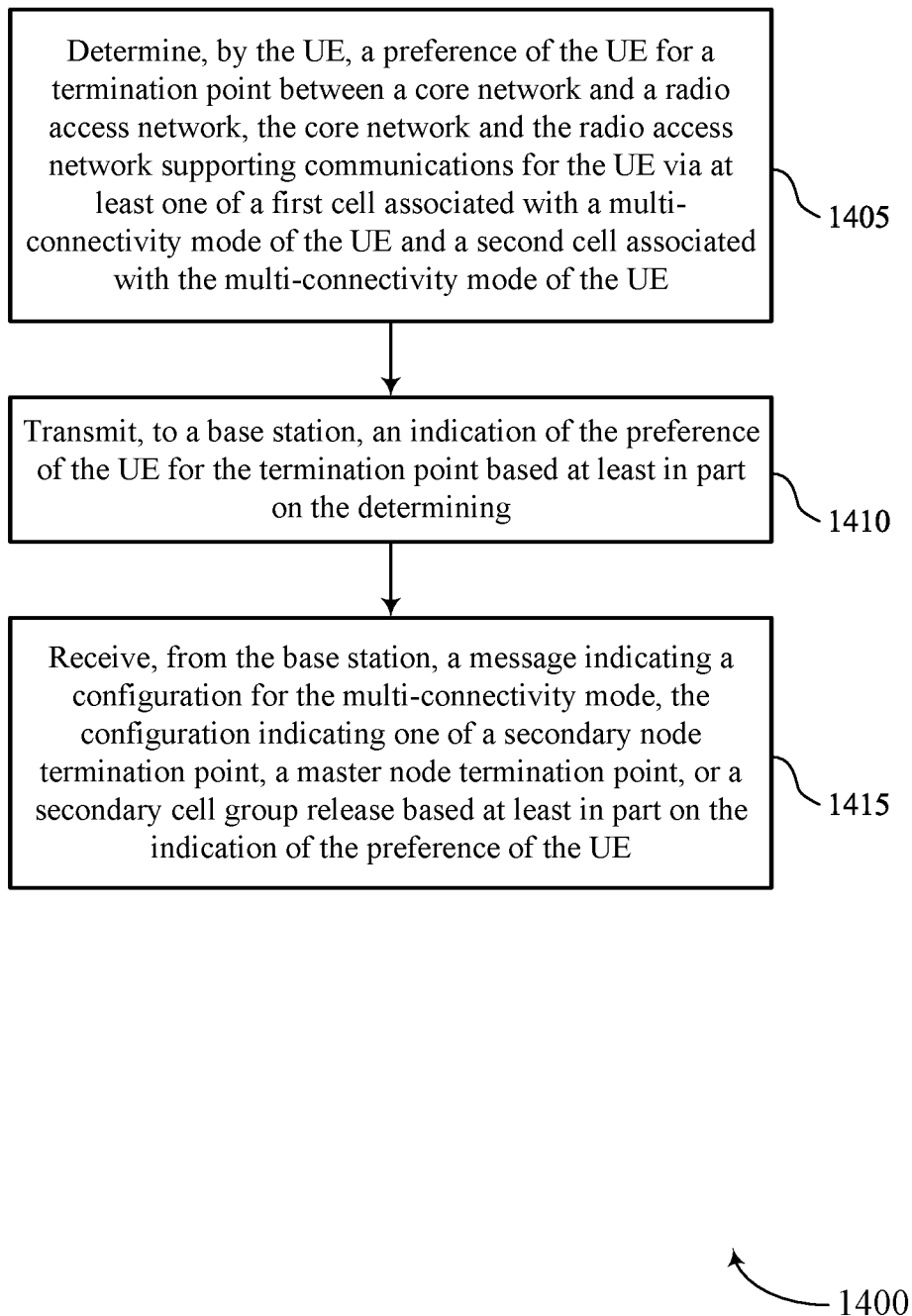

FIG. 14 shows a flowchart illustrating a method 1400 that supports UE assisted termination selection for NSA or DC in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE. The operations of 1405 may be performed in accordance with examples as disclosed herein. In some examples, aspects of the operations of 1405 may be performed by a preference determination component 725 as described with reference to FIG. 7.

At 1410, the method may include transmitting, to a base station, an indication of the preference of the UE for the termination point based on the determining. The operations of 1410 may be performed in accordance with examples as disclosed herein. In some examples, aspects of the operations of 1410 may be performed by an indication transmission component 730 as described with reference to FIG. 7.

At 1415, the method may include receiving, from the base station, a message indicating a configuration for the multi-connectivity mode, the configuration indicating one of a secondary node termination point, a master node termination point, or an SCG release based on the indication of the preference of the UE. The operations of 1415 may be performed in accordance with examples as disclosed herein. In some examples, aspects of the operations of 1415 may be performed by a message reception component 745 as described with reference to FIG. 7.

Figure 15:
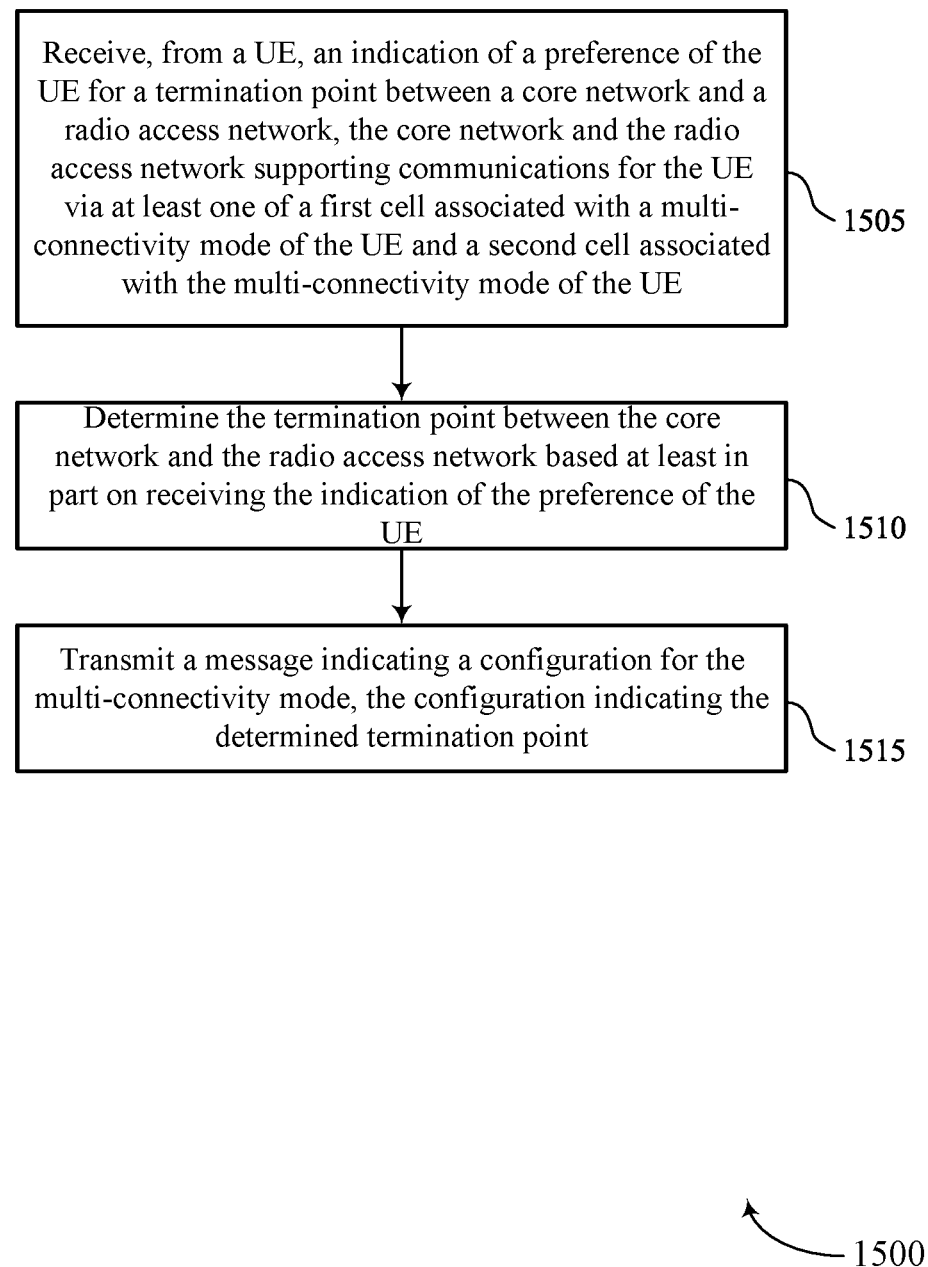

FIG. 15 shows a flowchart illustrating a method 1500 that supports UE assisted termination selection for NSA or DC in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1505, the method may include receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The operations of 1505 may be performed in accordance with examples as disclosed herein. In some examples, aspects of the operations of 1505 may be performed by an indication reception component 1125 as described with reference to FIG. 11.

At 1510, the method may include determining the termination point between the core network and the RAN based on receiving the indication of the preference of the UE. The operations of 1510 may be performed in accordance with examples as disclosed herein. In some examples, aspects of the operations of 1510 may be performed by a termination point component 1130 as described with reference to FIG. 11.

At 1515, the method may include transmitting a message indicating a configuration for the multi-connectivity mode, the configuration indicating the determined termination point. The operations of 1515 may be performed in accordance with examples as disclosed herein. In some examples, aspects of the operations of 1515 may be performed by a message transmission component 1135 as described with reference to FIG. 11.

Figure 16:
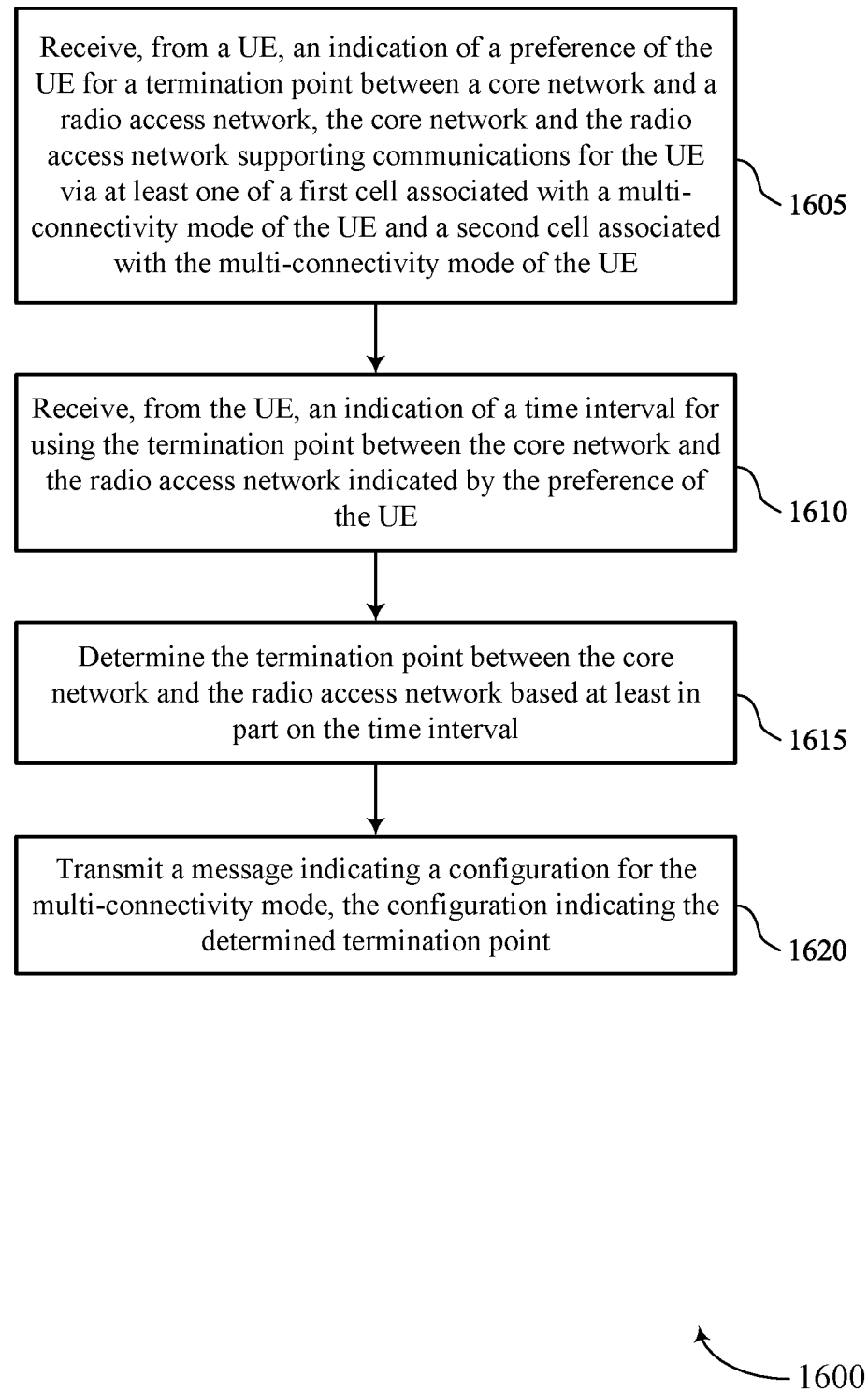

FIG. 16 shows a flowchart illustrating a method 1600 that supports UE assisted termination selection for NSA or DC in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The operations of 1605 may be performed in accordance with examples as disclosed herein. In some examples, aspects of the operations of 1605 may be performed by an indication reception component 1125 as described with reference to FIG. 11.

At 1610, the method may include receiving, from the UE, an indication of a time interval for using the termination point between the core network and the RAN indicated by the preference of the UE. The operations of 1610 may be performed in accordance with examples as disclosed herein. In some examples, aspects of the operations of 1610 may be performed by a time interval reception component 1140 as described with reference to FIG. 11.

At 1615, the method may include determining the termination point between the core network and the RAN based on the time interval. The operations of 1615 may be performed in accordance with examples as disclosed herein. In some examples, aspects of the operations of 1615 may be performed by a termination point component 1130 as described with reference to FIG. 11.

At 1620, the method may include transmitting a message indicating a configuration for the multi-connectivity mode, the configuration indicating the determined termination point. The operations of 1620 may be performed in accordance with examples as disclosed herein. In some examples, aspects of the operations of 1620 may be performed by a message transmission component 1135 as described with reference to FIG. 11.

Figure 17:
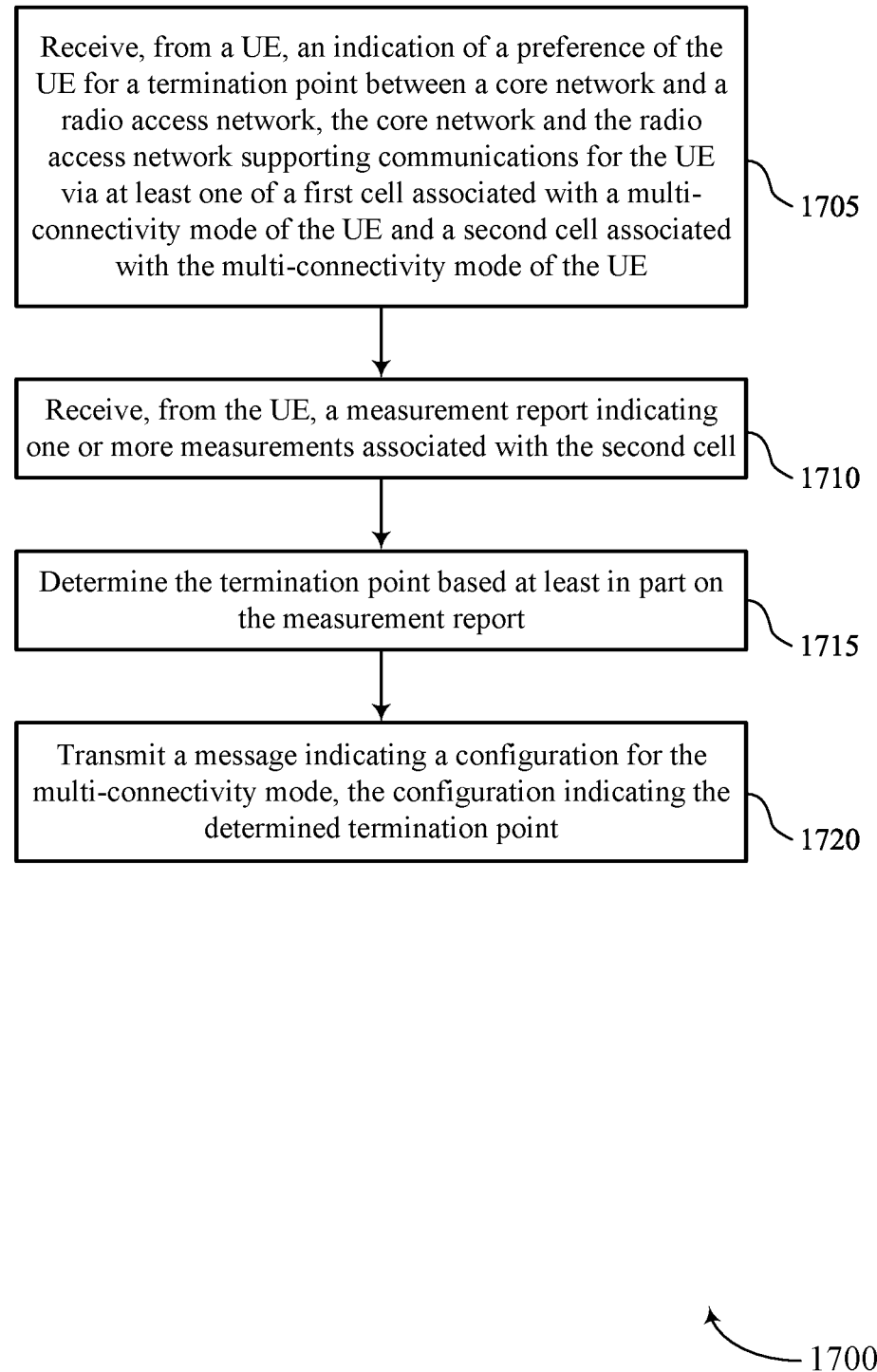

FIG. 17 shows a flowchart illustrating a method 1700 that supports UE assisted termination selection for NSA or DC in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1705, the method may include receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE. The operations of 1705 may be performed in accordance with examples as disclosed herein. In some examples, aspects of the operations of 1705 may be performed by an indication reception component 1125 as described with reference to FIG. 11.

At 1710, the method may include receiving, from the UE, a measurement report indicating one or more measurements associated with the second cell. The operations of 1710 may be performed in accordance with examples as disclosed herein. In some examples, aspects of the operations of 1710 may be performed by a measurement report reception component 1145 as described with reference to FIG. 11.

At 1715, the method may include determining the termination point based on the measurement report. The operations of 1715 may be performed in accordance with examples as disclosed herein. In some examples, aspects of the operations of 1715 may be performed by a termination point component 1130 as described with reference to FIG. 11.

At 1720, the method may include transmitting a message indicating a configuration for the multi-connectivity mode, the configuration indicating the determined termination point. The operations of 1720 may be performed in accordance with examples as disclosed herein. In some examples, aspects of the operations of 1720 may be performed by a message transmission component 1135 as described with reference to FIG. 11.

The following provides an overview of aspects of the present disclosure:

Aspect 1: A method for wireless communications at a UE, comprising: determining, by the UE, a preference of the UE for a termination point between a core network and a RAN, the core network and the RAN supporting communications for the UE via at least one of a first cell associated with a multi-connectivity mode of the UE and a second cell associated with the multi-connectivity mode of the UE; and transmitting, to a base station, an indication of the preference of the UE for the termination point based at least in part on the determining.

Aspect 2: The method of aspect 1, wherein determining the preference of the UE for the termination point between the core network and the RAN comprises: determining, by the UE in the multi-connectivity mode with at least the first cell and the second cell, the preference of the UE for the termination point as one of a secondary node termination point, a master node termination point, or an SCG release.

Aspect 3: The method of any of aspects 1 through 2, wherein determining the preference of the UE for the termination point between the core network and the RAN comprises: determining, by the UE in the multi-connectivity mode with at least the first cell and the second cell, the preference of the UE for the termination point based at least in part on a radio frequency variation of the second cell, application traffic throughput associated with one of the first cell or the second cell, a latency associated with one of the first cell or the second cell, or a combination thereof.

Aspect 4: The method of any of aspects 1 through 3, further comprising: determining, by the UE in the multi-connectivity mode with at least the first cell and the second cell, a time interval for using the termination point between the core network and the RAN indicated by the preference of the UE; and transmitting an indication of the time interval to the base station.

Aspect 5: The method of any of aspects 1 through 4, further comprising: determining, by the UE in the multi-connectivity mode with at least the first cell and the second cell, a time interval for using a current termination point between the core network and the RAN; and transmitting an indication of the time interval to the base station.

Aspect 6: The method of any of aspects 1 through 5, further comprising: determining, by the UE in the multi-connectivity mode with at least the first cell and the second cell, a time interval for the UE to operate in a dormant mode with the second cell based at least in part on the preference of the UE for the termination point being the first cell; and transmitting an indication of the time interval to the base station.

Aspect 7: The method of any of aspects 1 through 6, further comprising: receiving, from the base station, a message indicating a configuration for the multi-connectivity mode, the configuration indicating one of a secondary node termination point, a master node termination point, or an SCG release based at least in part on the indication of the preference of the UE.

Aspect 8: The method of aspect 7, further comprising: transmitting, by the UE, a measurement report indicating one or more measurements associated with the second cell, wherein the message indicating the configuration for the multi-connectivity mode is received based at least in part on the measurement report.

Aspect 9: The method of any of aspects 1 through 8, wherein transmitting the indication of the preference of the UE for the termination point comprises: transmitting the indication of the preference of the UE for the termination point via RRC signaling or a MAC-CE.

Aspect 10: The method of any of aspects 1 through 9, wherein the termination point corresponds to a master node associated with the first cell or a secondary node associated with the second cell.

Aspect 11: The method of any of aspects 1 through 10, wherein the UE is operating in an NSA mode, a DC mode, or the multi-connectivity mode.

Aspect 12: A method for wireless communications at a base station, comprising: receiving, from a UE, an indication of a preference of the UE for a termination point between a core network and a RAN, the core network and the RAN supporting communications for the UE via at least one of a first cell associated with a multi-connectivity mode of the UE and a second cell associated with the multi-connectivity mode of the UE; determining the termination point between the core network and the RAN based at least in part on receiving the indication of the preference of the UE; and transmitting a message indicating a configuration for the multi-connectivity mode, the configuration indicating the determined termination point.

Aspect 13: The method of aspect 12, wherein determining the termination point between the core network and the RAN comprises: determining the termination point based at least in part on a switching frequency between secondary cell addition and secondary cell release, a bandwidth usage of one or more backhaul links associated with the base station, the first cell, or the second cell, a time duration associated with a current termination point, or any combination thereof.

Aspect 14: The method of any of aspects 12 through 13, further comprising: receiving, from the UE, an indication of a time interval for using the termination point between the core network and the RAN indicated by the preference of the UE; and determining the termination point based at least in part on the time interval.

Aspect 15: The method of any of aspects 12 through 14, further comprising: receiving, from the UE, an indication of a time interval for using a current termination point between the core network and the RAN indicated by the preference of the UE; and determining the termination point based at least in part on the time interval.

Aspect 16: The method of any of aspects 12 through 15, further comprising: receiving, from the UE, an indication of a time interval for the UE to operate in a dormant mode with the second cell based at least in part on the preference of the UE; and determining the termination point based at least in part on the time interval.

Aspect 17: The method of any of aspects 12 through 16, further comprising: receiving, from the UE, a measurement report indicating one or more measurements associated with the second cell; and determining the termination point based at least in part on the measurement report.

Aspect 18: The method of any of aspects 12 through 17, wherein receiving the indication of the preference of the UE comprises: receiving the indication of the preference of the UE for the termination point via RRC signaling or a MAC-CE.

Aspect 19: The method of any of aspects 12 through 18, wherein the configuration indicates one of a secondary node termination point, a master node termination point, or an SCG release based at least in part on the indication of the preference of the UE.

Aspect 20: The method of any of aspects 12 through 19, wherein the preference of the UE for the termination point is one of a secondary node termination point, a master node termination point, or an SCG release.

Aspect 21: The method of any of aspects 12 through 20, wherein the preference of the UE for the termination point is based at least in part on a radio frequency variation of the second cell, application traffic throughput associated with one of the first cell or the second cell, a latency associated with one of the first cell or the second cell, or a combination thereof.

Aspect 22: The method of any of aspects 12 through 21, wherein the termination point corresponds to a master node associated with the first cell or a secondary node associated with the second cell.

Aspect 23: An apparatus for wireless communications at a UE, comprising a processor; memory in electronic communication with the processor, and instructions stored in the memory, where the instructions are executable by the processor to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a base station, comprising a processor; memory in electronic communication with the processor, and instructions stored in the memory, where the instructions are executable by the processor to perform a method of any of aspects 12 through 22.

Aspect 27: An apparatus for wireless communications at a base station, comprising at least one means for performing a method of any of aspects 12 through 22.

Aspect 28: A non-transitory computer-readable medium storing code for wireless communications at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   determining, by the UE, a preference of the UE for a termination point between a core network and a radio access network, the core network and the radio access network supporting communications for the UE via at least one of a first cell associated with a multi-connectivity mode of the UE and a second cell associated with the multi-connectivity mode of the UE; and
   transmitting, to a base station, an indication of the preference of the UE for the termination point based at least in part on the determining.

2. The method of claim 1, wherein determining the preference of the UE for the termination point between the core network and the radio access network comprises:
   determining, by the UE in the multi-connectivity mode with at least the first cell and the second cell, the preference of the UE for the termination point as one of a secondary node termination point, a master node termination point, or a secondary cell group release.

3. The method of claim 1, wherein determining the preference of the UE for the termination point between the core network and the radio access network comprises:
   determining, by the UE in the multi-connectivity mode with at least the first cell and the second cell, the preference of the UE for the termination point based at least in part on a radio frequency variation of the second cell, application traffic throughput associated with one of the first cell or the second cell, a latency associated with one of the first cell or the second cell, or a combination thereof.

4. The method of claim 1, further comprising:
   determining, by the UE in the multi-connectivity mode with at least the first cell and the second cell, a time interval for using the termination point between the core network and the radio access network indicated by the preference of the UE; and
   transmitting an indication of the time interval to the base station.

5. The method of claim 1, further comprising:
   determining, by the UE in the multi-connectivity mode with at least the first cell and the second cell, a time interval for using a current termination point between the core network and the radio access network; and
   transmitting an indication of the time interval to the base station.

6. The method of claim 1, further comprising:
   determining, by the UE in the multi-connectivity mode with at least the first cell and the second cell, a time interval for the UE to operate in a dormant mode with the second cell based at least in part on the preference of the UE for the termination point being the first cell; and
   transmitting an indication of the time interval to the base station.

7. The method of claim 1, further comprising:
   receiving, from the base station, a message indicating a configuration for the multi-connectivity mode, the configuration indicating one of a secondary node termination point, a master node termination point, or a secondary cell group release based at least in part on the indication of the preference of the UE.

8. The method of claim 7, further comprising:
   transmitting, by the UE, a measurement report indicating one or more measurements associated with the second cell, wherein the message indicating the configuration for the multi-connectivity mode is received based at least in part on the measurement report.

9. The method of claim 1, wherein transmitting the indication of the preference of the UE for the termination point comprises:

transmitting the indication of the preference of the UE for the termination point via radio resource control (RRC) signaling or a medium access control (MAC) control element (MAC-CE).

10. The method of claim 1, wherein the termination point corresponds to a master node associated with the first cell or a secondary node associated with the second cell.

11. The method of claim 1, wherein the UE is operating in a non-standalone mode, a dual connectivity mode, or the multi-connectivity mode.

12. A method for wireless communications at a base station, comprising:
receiving, from a user equipment (UE), an indication of a preference of the UE for a termination point between a core network and a radio access network, the core network and the radio access network supporting communications for the UE via at least one of a first cell associated with a multi-connectivity mode of the UE and a second cell associated with the multi-connectivity mode of the UE;
determining the termination point between the core network and the radio access network based at least in part on receiving the indication of the preference of the UE; and
transmitting a message indicating a configuration for the multi-connectivity mode, the configuration indicating the determined termination point.

13. The method of claim 12, wherein determining the termination point between the core network and the radio access network comprises:
determining the termination point based at least in part on a switching frequency between secondary cell addition and secondary cell release, a bandwidth usage of one or more backhaul links associated with the base station, the first cell, or the second cell, a time duration associated with a current termination point, or any combination thereof.

14. The method of claim 12, further comprising:
receiving, from the UE, an indication of a time interval for using the termination point between the core network and the radio access network indicated by the preference of the UE; and
determining the termination point based at least in part on the time interval.

15. The method of claim 12, further comprising:
receiving, from the UE, an indication of a time interval for using a current termination point between the core network and the radio access network indicated by the preference of the UE; and
determining the termination point based at least in part on the time interval.

16. The method of claim 12, further comprising:
receiving, from the UE, an indication of a time interval for the UE to operate in a dormant mode with the second cell based at least in part on the preference of the UE; and
determining the termination point based at least in part on the time interval.

17. The method of claim 12, further comprising:
receiving, from the UE, a measurement report indicating one or more measurements associated with the second cell; and
determining the termination point based at least in part on the measurement report.

18. The method of claim 12, wherein receiving the indication of the preference of the UE comprises:

receiving the indication of the preference of the UE for the termination point via radio resource control (RRC) signaling or a medium access control (MAC) control element (MAC-CE).

19. The method of claim 12, wherein the configuration indicates one of a secondary node termination point, a master node termination point, or a secondary cell group release based at least in part on the indication of the preference of the UE.

20. The method of claim 12, wherein the preference of the UE for the termination point is one of a secondary node termination point, a master node termination point, or a secondary cell group release.

21. The method of claim 12, wherein the preference of the UE for the termination point is based at least in part on a radio frequency variation of the second cell, application traffic throughput associated with one of the first cell or the second cell, a latency associated with one of the first cell or the second cell, or a combination thereof.

22. The method of claim 12, wherein the termination point corresponds to a master node associated with the first cell or a secondary node associated with the second cell.

23. An apparatus for wireless communications at a user equipment (UE), comprising:
a processor;
memory in electronic communication with the processor; and
instructions stored in the memory, wherein the instructions are executable by the processor to:
determine, by the UE, a preference of the UE for a termination point between a core network and a radio access network, the core network and the radio access network supporting communications for the UE via at least one of a first cell associated with a multi-connectivity mode of the UE and a second cell associated with the multi-connectivity mode of the UE; and
transmit, to a base station, an indication of the preference of the UE for the termination point based at least in part on the determining.

24. The apparatus of claim 23, wherein the instructions executable by the processor to determine the preference of the UE for the termination point between the core network and the radio access network comprise instructions executable by the processor to:
determine, by the UE in the multi-connectivity mode with at least the first cell and the second cell, the preference of the UE for the termination point as one of a secondary node termination point, a master node termination point, or a secondary cell group release.

25. The apparatus of claim 23, wherein the instructions executable by the processor to determine the preference of the UE for the termination point between the core network and the radio access network comprise instructions executable by the processor to:
determine, by the UE in the multi-connectivity mode with at least the first cell and the second cell, the preference of the UE for the termination point based at least in part on a radio frequency variation of the second cell, application traffic throughput associated with one of the first cell or the second cell, a latency associated with one of the first cell or the second cell, or a combination thereof.

26. The apparatus of claim 23, wherein the instructions executable by the processor further comprise instructions executable by the processor to:

determine, by the UE in the multi-connectivity mode with at least the first cell and the second cell, a time interval for using the termination point between the core network and the radio access network indicated by the preference of the UE; and transmit an indication of the time interval to the base station.

27. The apparatus of claim 23, wherein the instructions executable by the processor further comprise instructions executable by the processor to:

determine, by the UE in the multi-connectivity mode with at least the first cell and the second cell, a time interval for using a current termination point between the core network and the radio access network; and transmit an indication of the time interval to the base station.

28. An apparatus for wireless communications at a base station, comprising:

a processor;

memory in electronic communication with the processor; and instructions stored in the memory, wherein the instructions are executable by the processor to:

receive, from a user equipment (UE), an indication of a preference of the UE for a termination point between a core network and a radio access network, the core network and the radio access network supporting communications for the UE via at least one of a first cell associated with a multi-connectivity mode of the UE and a second cell associated with the multi-connectivity mode of the UE;

determine the termination point between the core network and the radio access network based at least in part on receiving the indication of the preference of the UE; and transmit a message indicating a configuration for the multi-connectivity mode, the configuration indicating the determined termination point.

29. The apparatus of claim 28, wherein the instructions executable by the processor to determine the termination point between the core network and the radio access network comprise instructions executable by the processor to:

determine the termination point based at least in part on a switching frequency between secondary cell addition and secondary cell release, a bandwidth usage of one or more backhaul links associated with the base station, the first cell, or the second cell, a time duration associated with a current termination point, or any combination thereof.

30. The apparatus of claim 28, wherein the instructions executable by the processor further comprise instructions executable by the processor to:

receive, from the UE, an indication of a time interval for using the termination point between the core network and the radio access network indicated by the preference of the UE; and determine the termination point based at least in part on the time interval.

* * * * *